United States Patent
Li

(10) Patent No.: US 9,794,889 B2
(45) Date of Patent: Oct. 17, 2017

(54) POWER ADJUSTMENT METHOD AND APPARATUS

(71) Applicant: Huawei Device Co., Ltd., Shenzhen (CN)

(72) Inventor: Min Li, Wuhan (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 15/309,706

(22) PCT Filed: May 9, 2014

(86) PCT No.: PCT/CN2014/077123
§ 371 (c)(1),
(2) Date: Nov. 8, 2016

(87) PCT Pub. No.: WO2015/168926
PCT Pub. Date: Nov. 12, 2015

(65) Prior Publication Data
US 2017/0150455 A1 May 25, 2017

(51) Int. Cl.
*H04W 52/24* (2009.01)
*H04W 52/36* (2009.01)

(52) U.S. Cl.
CPC ......... *H04W 52/241* (2013.01); *H04W 52/36* (2013.01)

(58) Field of Classification Search
CPC ... H04L 1/0003; H04L 1/0009; H04L 1/0015; H04L 1/0025; H04L 1/1809; H04L 1/1867; H04W 52/48; H04W 52/50
(Continued)

(56) References Cited

U.S. PATENT DOCUMENTS 5,450,616 A * 9/1995 Rom .................. H04W 52/60
455/522
5,710,982 A * 1/1998 Laborde ............ H04B 7/18543
455/69
(Continued)

FOREIGN PATENT DOCUMENTS

CN 1889380 A 1/2007
CN 101137236 A 3/2008
(Continued)

OTHER PUBLICATIONS

Machine Translation and Abstract of Chinese Publication No. CN101448312, Jun. 3, 2009, 5 pages.
(Continued)

*Primary Examiner* — Tan H Trinh
(74) *Attorney, Agent, or Firm* — Conley Rose, P.C.

(57) ABSTRACT

An apparatus includes a receiving module, an obtaining module, an adjustment module, and a sending module, where the receiving module is configured to receive a signal sent by a terminal device; the obtaining module is configured to obtain a signal quality indicator according to the signal received by the receiving module, where the signal quality indicator is used to identify signal quality of a signal sent by the power adjustment apparatus and received by the terminal device; the adjustment module is configured to adjust a transmit power according to the signal quality indicator after the obtaining module obtains the signal quality indicator; and the sending module is configured to send a signal according to the transmit power adjusted by the adjustment module.

12 Claims, 7 Drawing Sheets

(58) Field of Classification Search
USPC ......... 455/69, 522, 452.2, 67.7, 435.1, 13.4, 455/423, 127.1; 370/336, 329, 479, 342, 370/335, 318; 375/259; 711/135; 709/206
See application file for complete search history.

(56) References Cited

U.S. PATENT DOCUMENTS

| | | | | |
|---|---|---|---|---|
| 6,084,904 | A * | 7/2000 | Wang | H04W 52/125 370/335 |
| 7,184,777 | B2 * | 2/2007 | Diener | H04L 41/0896 455/456.1 |
| 7,860,526 | B2 * | 12/2010 | Koo | H04W 52/12 455/127.1 |
| 8,054,775 | B2 * | 11/2011 | Soong | H04L 1/0002 370/318 |
| 8,271,013 | B2 * | 9/2012 | Sagfors | H04L 1/0015 455/13.4 |
| 9,049,108 | B2 * | 6/2015 | Ji | H04L 41/065 |
| 2004/0047327 | A1 * | 3/2004 | Chen | H04W 52/54 370/342 |
| 2004/0047425 | A1 * | 3/2004 | Itoh | H04L 1/0001 375/259 |
| 2004/0082608 | A1 * | 4/2004 | Hong | C07D 401/12 514/312 |
| 2004/0092233 | A1 * | 5/2004 | Rudrapatna | H04W 52/60 455/69 |
| 2004/0236834 | A1 * | 11/2004 | Kreitzer | H04L 12/5855 709/206 |
| 2005/0118993 | A1 * | 6/2005 | Roux | H04B 7/022 455/423 |
| 2005/0226182 | A1 * | 10/2005 | Itoh | H04L 1/0003 370/329 |
| 2006/0178146 | A1 * | 8/2006 | Lee | H04W 8/04 455/435.1 |
| 2007/0258508 | A1 * | 11/2007 | Werb | H04W 84/18 375/140 |
| 2008/0132265 | A1 * | 6/2008 | Tudosoiu | H04B 7/0877 455/522 |
| 2008/0227461 | A1 * | 9/2008 | Dayal | H04L 1/0025 455/452.2 |
| 2008/0317066 | A1 * | 12/2008 | Trine | G10L 19/008 370/479 |
| 2009/0059814 | A1 * | 3/2009 | Nixon | H04L 41/12 370/254 |
| 2010/0233975 | A1 * | 9/2010 | Wu | H04W 52/52 455/115.1 |
| 2010/0313241 | A1 | 12/2010 | Lee et al. | |
| 2011/0116410 | A1 | 5/2011 | Sung et al. | |
| 2012/0008510 | A1 * | 1/2012 | Cai | H04B 7/0404 370/252 |
| 2013/0011407 | A1 * | 1/2013 | Nishioka | A61K 9/0019 424/143.1 |
| 2013/0114407 | A1 | 5/2013 | Liu et al. | |
| 2013/0254014 | A1 * | 9/2013 | Yao | G06Q 30/0243 705/14.42 |
| 2013/0259011 | A1 * | 10/2013 | Nakashima | H04W 72/0473 370/336 |
| 2013/0336288 | A1 * | 12/2013 | Tu | H04W 36/0077 370/331 |
| 2014/0045434 | A1 * | 2/2014 | Park | H04W 24/00 455/67.7 |
| 2014/0274196 | A1 * | 9/2014 | Dai | H04W 52/242 455/522 |
| 2015/0036498 | A1 * | 2/2015 | Ehara | H04L 47/12 370/235 |
| 2015/0370712 | A1 * | 12/2015 | Cheng | G06F 12/128 711/135 |
| 2016/0088649 | A1 * | 3/2016 | Xia | H04L 45/125 370/329 |
| 2016/0134496 | A1 * | 5/2016 | Cheng | H04L 43/0894 709/224 |
| 2016/0335177 | A1 * | 11/2016 | Huang | G06F 12/0864 |

FOREIGN PATENT DOCUMENTS

| | | |
|---|---|---|
| CN | 101448312 A | 6/2009 |
| CN | 102088725 A | 6/2011 |
| CN | 102783224 A | 11/2012 |
| CN | 102804873 A | 11/2012 |
| CN | 103200659 A | 7/2013 |
| CN | 103415066 A | 11/2013 |
| KR | 100691367 B1 | 2/2007 |

OTHER PUBLICATIONS

Machine Translation and Abstract of Chinese Publication No. CN1889380, Jan. 3, 2007, 18 pages.
Machine Translation and Abstract of Chinese Publication No. CN103415066, Nov. 27, 2013, 11 pages.
Pichna, R., et al., "Power Control," XP55040348, CRC Press LLC, Apr. 29, 2002, 11 pages.
Foreign Communication From a Counterpart Application, European Application No. 14891469.0, Extended European Search Report dated Feb. 17, 2017, 6 pages.
Foreign Communication From a Counterpart Application, PCT Application No. PCT/CN2014/077123, English Translation of International Search Report dated Feb. 11, 2015, 3 pages.
Foreign Communication From a Counterpart Application, PCT Application No. PCT/CN2014/077123, English Translation of Written Opinion dated Feb. 11, 2015, 6 pages.
Machine Translation and Abstract of Chinese Publication No. CN103200659, dated Jul. 10, 2013, 6 pages.
Foreign Communication From A Counterpart Application, Chinese Application No. 201480001358.4, Chinese Office Action dated Jul. 13, 2017, 8 pages.

* cited by examiner

POWER ADJUSTMENT METHOD AND APPARATUS

CROSS-REFERENCE TO RELATED APPLICATIONS

This application is a national stage application of international patent application number PCT/CN2014/077123 filed on May 9, 2014, which is incorporated by reference.

TECHNICAL FIELD

This application relates to the field of communications networks, and in particular, to a power adjustment apparatus and method.

BACKGROUND

With development of wireless network communications technologies, a wireless fidelity (WiFi) technology is more widely applied, and an increasing quantity of terminal devices access a core network by using a WiFi access point (AP). Because quality of a signal sent by a WiFi access point and received by a terminal device is affected by factors such as a distance between the terminal device and the WiFi access point and ambient interference, to ensure that the terminal device can always well receive the signal sent by the WiFi access point and to reduce energy consumption, a transmit power of the WiFi access point needs to be adjusted. For example, when the distance between the terminal device and the WiFi access point is relatively short, the transmit power of the WiFi access point is reduced, to reduce energy consumption. When the distance between the terminal device and the WiFi access point is relatively long, the transmit power of the WiFi access point is increased, to ensure receiving quality.

Some approaches provide a power adjustment method: a current received signal strength indicator (RSSI) value of the WiFi access point is obtained at intervals of a preset time period, and the transmit power of the WiFi access point is dynamically adjusted according to the obtained RSSI value. Generally, when the distance between the terminal device and the WiFi access point is relatively short, the RSSI value is relatively large; when the distance between the terminal device and the WiFi access point is relatively long, the RSSI value is relatively small. Therefore, the terminal device can well receive the signal sent by the WiFi access point and energy consumption can be reduced by adjusting the transmit power according to the RSSI value.

However, the RSSI value can reflect only strength of a signal sent by the terminal device and received by the WiFi access point, and cannot exactly reflect a status of the signal sent by the WiFi access point and received by the terminal device. In some cases, received signal strength of the WiFi access point is extremely great, but the quality of the signal sent by the WiFi access point and received by the terminal device is extremely poor. For example, when the distance between the WiFi access point and the terminal device is extremely short, but ambient noise is extremely great, strength of the signal received by the terminal device is also extremely great, but because the noise is also extremely great, affected by the noise, the terminal device cannot well restore the signal during decoding, causing extremely poor received signal quality of the terminal device.

In such a case, the transmit power should be increased to improve the received signal quality of the terminal device. However, in the existing mechanism, the WiFi access point incorrectly determines, according to a relatively large RSSI value, that the transmit power does not need to be increased, which causes the extremely poor received signal quality of the terminal device.

SUMMARY

To resolve the technical problem, this application provides a power adjustment apparatus and method, which can dynamically adjust a transmit power of an access point according to a signal quality indicator of a signal received by a terminal device.

To resolve the foregoing problem, a first aspect of this application provides a power adjustment apparatus, including: a receiving module, an adjustment module, and a sending module, where the receiving module is configured to receive a signal sent by a terminal device; the adjustment module is configured to obtain a signal quality indicator according to the signal received by the receiving module, and adjust a transmit power according to the signal quality indicator, where the signal quality indicator is used to identify signal quality of a signal sent by the power adjustment apparatus and received by the terminal device; and the sending module is configured to send the signal according to the transmit power adjusted by the adjustment module.

With reference to the first aspect, in a first possible implementation manner of the first aspect of this application, the signal quality indicator is a signal quality value or a noise quality value, where the signal quality value is used to identify quality of the signal sent by the power adjustment apparatus and received by the terminal device, and the noise quality value is used to identify noise of the signal received by the terminal device.

With reference to the first aspect or the first possible implementation manner of the first aspect, in a second possible implementation manner of the first aspect of this application, the apparatus further includes: a statistics collection module, where the statistics collection module is configured to collect statistics on minimum values of signal quality indicators at intervals of a first preset time period, and calculate an average value of the minimum values at intervals of a second preset time period, where the adjustment module is specifically configured to adjust the transmit power according to the average value of the minimum values after the statistics collection module obtains the average value of the minimum values.

With reference to the second possible implementation manner of the first aspect, in a third possible implementation manner of the first aspect of this application, the adjustment module is specifically configured to determine, according to the current average value, a preset range to which the average value belongs after the statistics collection module obtains the average value of the minimum values, and adjust the transmit power according to the preset range to which the average value belongs, where the preset range includes at least two subranges arranged according to a preset rule, and each subrange corresponds to a transmit power.

With reference to the second possible implementation manner of the first aspect, in a fourth possible implementation manner of the first aspect of this application, when the signal quality indicator is a signal quality value, the adjustment module is specifically configured to determine a change trend of the average value according to at least two successive average values after the statistics collection module obtains the average value of the minimum values, and adjust the transmit power according to the change trend of the average value.

With reference to the second possible implementation manner of the first aspect, in a fifth possible implementation manner of the first aspect of this application, when the signal quality indicator is a signal quality value, the adjustment module is specifically configured to determine, according to the current average value, a preset range to which the average value belongs after the statistics collection module obtains the average value of the minimum values, determine a change trend of the average value according to at least two successive average values, and adjust the transmit power according to the preset range to which the average value belongs and the change trend of the average value.

To resolve the foregoing problem, a second aspect of this application provides a power adjustment apparatus, including a receiver, a processor, and a transmitter, where the receiver is connected to the processor, and the transmitter is connected to the processor; the receiver is configured to receive a signal sent by a terminal device; the processor is configured to obtain a signal quality value according to the signal received by the receiver, and adjust a transmit power according to the signal quality value, where the signal quality indicator is used to identify signal quality of a signal sent by the power adjustment apparatus and received by the terminal device; and the transmitter is configured to send a signal according to the transmit power adjusted by the processor.

With reference to the second aspect, in a first possible implementation manner of the second aspect of this application, the signal quality indicator is a signal quality value or a noise quality value, where the signal quality value is used to identify quality of the signal sent by the power adjustment apparatus and received by the terminal device, and the noise quality value is used to identify noise of the signal received by the terminal device.

With reference to the second aspect or the first possible implementation manner of the second aspect, in a second possible implementation manner of the second aspect of this application, the processor is further configured to collect statistics on minimum values of signal quality indicators at intervals of a first preset time period, and calculate an average value of the minimum values at intervals of a second preset time period; and the processor is specifically configured to adjust the transmit power according to the average value of the minimum values after obtaining the average value of the minimum values.

With reference to the second possible implementation manner of the second aspect, in a third possible implementation manner of the second aspect of this application, the processor is specifically configured to determine, according to the current average value, a preset range to which the average value belongs after obtaining the average value of the minimum values, and adjust the transmit power according to the preset range to which the average value belongs, where the preset range includes at least two subranges arranged according to a preset rule, and each subrange corresponds to a transmit power.

With reference to the second possible implementation manner of the second aspect, in a fourth possible implementation manner of the second aspect of this application, when the signal quality indicator is a signal quality value, the processor is specifically configured to determine a change trend of the average value according to at least two successive average values after obtaining the average value of the minimum values, and adjust the transmit power according to the change trend of the average value.

With reference to the second possible implementation manner of the second aspect, in a fifth possible implementation manner of the second aspect of this application, when the signal quality indicator is a signal quality value, the adjuster is specifically configured to determine, according to the current average value, a preset range to which the average value belongs after obtaining the average value of the minimum values, determine a change trend of the average value according to at least two successive average values, and adjust the transmit power according to the preset range to which the average value belongs and the change trend of the average value.

To resolve the foregoing problem, a third aspect of this application provides a power adjustment method, including the following steps: receiving a signal sent by a terminal device; obtaining a signal quality indicator according to the signal, where the signal quality indicator is used to identify signal quality of a signal sent by the power adjustment apparatus and received by the terminal device; and sending a signal according to the adjusted transmit power.

With reference to the third aspect, in a first possible implementation manner of the third aspect of this application, the signal quality indicator is a signal quality value or a noise quality value, where the signal quality value is used to identify quality of the signal sent by the power adjustment apparatus and received by the terminal device, and the noise quality value is used to identify noise of the signal received by the terminal device.

With reference to the third aspect or the first possible implementation manner of the third aspect, in a second possible implementation manner of the third aspect of this application, the method further includes: determining a minimum values of signal quality indicators at intervals of a first preset time period, and calculating an average value of the minimum values at intervals of a second preset time period; and the step of adjusting a transmit power according to the signal quality indicator is specifically: adjusting the transmit power according to the average value of the minimum values.

With reference to the second possible implementation manner of the third aspect, in a third possible implementation manner of the third aspect of this application, the step of adjusting a transmit power according to the signal quality indicator is specifically: determining, according to the current average value, a preset range to which the average value belongs, and adjusting the transmit power according to the preset range to which the average value belongs, where the preset range includes at least two subranges arranged according to a preset rule, and each subrange corresponds to a transmit power.

With reference to the second possible implementation manner of the third aspect, in a fourth possible implementation manner of the third aspect of this application, when the signal quality indicator is a signal quality value, the step of adjusting a transmit power according to the signal quality indicator is specifically: determining a change trend of the average value according to at least two successive average values, and adjusting the transmit power according to the change trend of the average value.

With reference to the second possible implementation manner of the third aspect, in a fifth possible implementation manner of the third aspect of this application, when the signal quality indicator is a signal quality value, the step of adjusting a transmit power according to the signal quality indicator is specifically: determining, according to the current average value, a preset range to which the average value belongs, and determining a change trend of the average value according to at least two successive average values;

and adjusting the transmit power according to the preset range to which the average value belongs and the change trend of the average value.

In the foregoing solutions, a signal quality indicator is obtained according to a signal sent by a terminal device, and a transmit power is adjusted according to the signal quality indicator. In this way, a power adjustment apparatus can dynamically adjust a transmit power according to a signal quality indicator of a signal sent by the power adjustment apparatus and received by the terminal device, and even if a signal sent by the power adjustment apparatus is affected by ambient interference and signal strength attenuates due to blocking by an obstruction such as a wall, receiving performance of the terminal device can still be ensured, which can improve communication reliability.

DESCRIPTION OF EMBODIMENTS

In the following description, to illustrate rather than limit, specific details such as a particular system structure, an interface, and a technology are provided to make a thorough understanding of this application. However, a person skilled in the art should know that this application may be practiced in other implementation manners without these specific details. In other cases, detailed descriptions of well-known apparatuses, circuits, and methods are omitted, so that this application is described without being obscured by unnecessary details.

Figure 1:
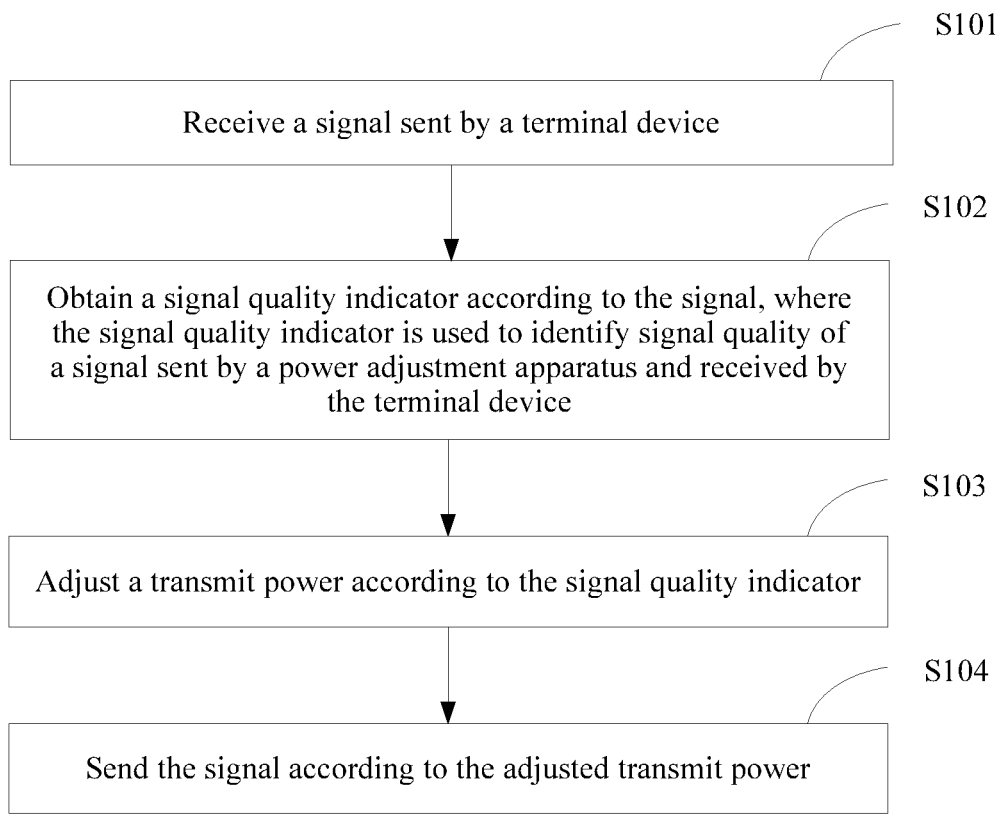
FIG. 1 is a flowchart of an implementation manner of a power adjustment method according to this application.

Referring to FIG. 1, FIG. 1 is a flowchart of an implementation manner of a power adjustment method according to this application. This implementation manner is described from the perspective of a power adjustment apparatus. The power adjustment apparatus may be a gateway or a router. This implementation manner includes the following steps:

S101: Receive a signal sent by a terminal device.

After starting, the power adjustment apparatus operates at a default preset transmit power. When needing to access the power adjustment apparatus, the terminal device sends a signal to the power adjustment apparatus, to request to access the power adjustment apparatus; or after the terminal already accesses the power adjustment apparatus, the terminal may perform signal interaction with the power adjustment apparatus. The power adjustment apparatus receives the signal sent by the terminal device.

Specifically, in this embodiment of the present disclosure, the power adjustment apparatus receives the signal sent by the terminal device. It should be understood that, the signal is a transmission form of a message sent by the terminal device, and is a carrier of the transmitted message. For example, in this embodiment, the signal may be an electrical signal. It should be further understood that, the signal sent by the terminal device is a message in essence. The message is content to be transmitted in the signal, and is the essence of the signal. That is, in this embodiment of the present disclosure, a relationship between the signal and the message is a relationship between carrier and content and between form and essence. In other words, that the power adjustment apparatus receives the signal sent by the terminal device includes that the power adjustment apparatus receives the message sent by the terminal device. The latter is a specific implementation manner of the former, and is also an implementation manner that better reflects the essence. When the power adjustment apparatus receives the message sent by the terminal device, the message may be a control frame, a management frame, or a data frame.

The control frame includes: an acknowledgement (ACK) frame, a request to send (RTS) frame, a clear to send (CTS) frame, a power save poll (PS-poll) frame, or the like. The management frame includes: a probe request frame, a beacon frame, an authentication frame, a deauthentication frame, or the like. In a process in which the power adjustment apparatus establishes a connection to the terminal device, the power adjustment apparatus receives a management frame or a control frame sent by the terminal device; when performing data transmission after establishing a connection to the terminal device, the power adjustment apparatus receives a data frame sent by the terminal device.

S102: Obtain a signal quality indicator according to the signal, where the signal quality indicator is used to identify signal quality of a signal sent by the power adjustment apparatus and received by the terminal.

After receiving the signal sent by the terminal device, the power adjustment apparatus obtains, according to the received signal, a signal quality indicator of a signal received by terminal device. The signal quality indicator is used to identify signal quality of the signal sent by the power adjustment apparatus and received by the terminal. That is, the signal quality indicator is used to identify the signal quality of the signal received by the terminal device. The signal quality indicator may include a signal quality value or a noise quality value. The signal quality value is used to identify quality of the signal sent by the power adjustment apparatus and received by the terminal device. The signal quality value may include a channel quality value and a signal strength value. The noise quality value is used to identify noise of the signal received by the terminal device. The noise quality value may include a signal strength value of a noise signal. In this implementation manner, the signal quality of the signal received by the terminal device is measured by using the signal quality indicator. When the signal quality indicator is a signal quality value, a larger value of the signal quality indicator indicates better signal quality of the signal received by the terminal device; when the signal quality indicator is a noise quality value, a larger value of the signal quality indicator indicates greater signal strength of the noise signal in the signal received by the terminal device and poorer signal quality.

For example, when the signal quality indicator is a signal quality value, if the signal quality indicator is 100, it indicates that the signal quality of the signal received by the terminal device is a preset ideal reference value; if the signal quality indicator is 90, it indicates that the signal quality of the signal received by the terminal device is 90% of the preset ideal reference value.

When the signal quality indicator is a noise quality value, if the signal quality indicator is 100, it indicates that the entire received signal is the noise signal, and the signal quality of the received signal is 0; if the signal quality indicator is 90, it indicates that 90% of the received signal is the noise signal, and the signal quality is 10% of the preset ideal reference value.

S103: Adjust a transmit power according to the signal quality indicator.

After obtaining the signal quality indicator, the power adjustment apparatus compares the signal quality indicator with a preset threshold, adjusts the transmit power according to a comparison result, and uses the adjusted transmit power as a final transmit power.

When the signal quality indicator is a signal quality value, if the signal quality indicator is less than the preset threshold, the transmit power is increased based on the original transmit power; if the signal quality indicator is greater than or equal to the preset threshold, the transmit power is not adjusted. For example, when the signal quality indicator is a signal quality value, and the preset threshold is 90, if the obtained signal quality indicator is 95, the power adjustment apparatus determines that the current signal quality indicator is greater than the preset threshold, and does not adjust the transmit power, that is, maintains the default preset transmit power; if the obtained signal quality indicator is 60, the power adjustment apparatus determines that the current signal quality indicator is less than the preset threshold, and increases the transmit power based on the default preset transmit power; if the obtained signal quality indicator is 90, the power adjustment apparatus determines that the current signal quality indicator is equal to the preset threshold, and adjusts the current transmit power to the default preset transmit power.

When the signal quality indicator is a noise quality value, if the signal quality indicator is less than or the preset threshold, the transmit power is not adjusted; if the signal quality indicator is greater than the preset threshold, the transmit power is increased based on the original transmit power. For example, when the signal quality indicator is a noise quality value, and the preset threshold is 10, if the obtained noise quality value is 5, the power adjustment apparatus determines that the current signal quality indicator is less than the preset threshold, and does not adjust the transmit power, that is, maintains the default preset transmit power; if the obtained signal quality indicator is 20, the power adjustment apparatus determines that the current signal quality indicator is greater than the preset threshold, and increases the transmit power based on the default preset transmit power; if the obtained signal quality indicator is 5, the power adjustment apparatus determines that the current signal quality indicator is equal to the preset threshold, and adjusts the current transmit power to the default preset transmit power.

The power adjustment apparatus uses the adjusted transmit power as the final transmit power.

It can be understood that, the transmit power that has been increased does not exceed a maximum value that is allowed for normal operation of the power adjustment apparatus, and the default preset transmit power, the preset threshold, and a value by which the transmit power is increased may be set according to an actual requirement and are not limited herein.

It can be understood that, in this implementation manner, only one preset threshold is set, and in another implementation manner, at least two preset thresholds may be set. The at least two thresholds form at least three intervals, and each interval corresponds to a value by which the transmit power needs to be increased or reduced. The transmit power is adjusted according to a range to which the signal quality indicator belongs.

S104: Send a signal according to the adjusted transmit power.

The power adjustment apparatus sends the signal according to the adjusted transmit power, to communicate with the terminal device in a network.

In the foregoing solution, a signal quality indicator is obtained according to a signal sent by a terminal device, and a transmit power is adjusted according to the signal quality indicator. In this way, a power adjustment apparatus can dynamically adjust a transmit power according to a signal quality indicator of a signal received by the terminal device, and even if a signal sent by the power adjustment apparatus is affected by ambient interference and signal strength attenuates due to blocking by an obstruction such as a wall, receiving performance of the terminal device can still be ensured, which can improve communication reliability.

Figure 2:
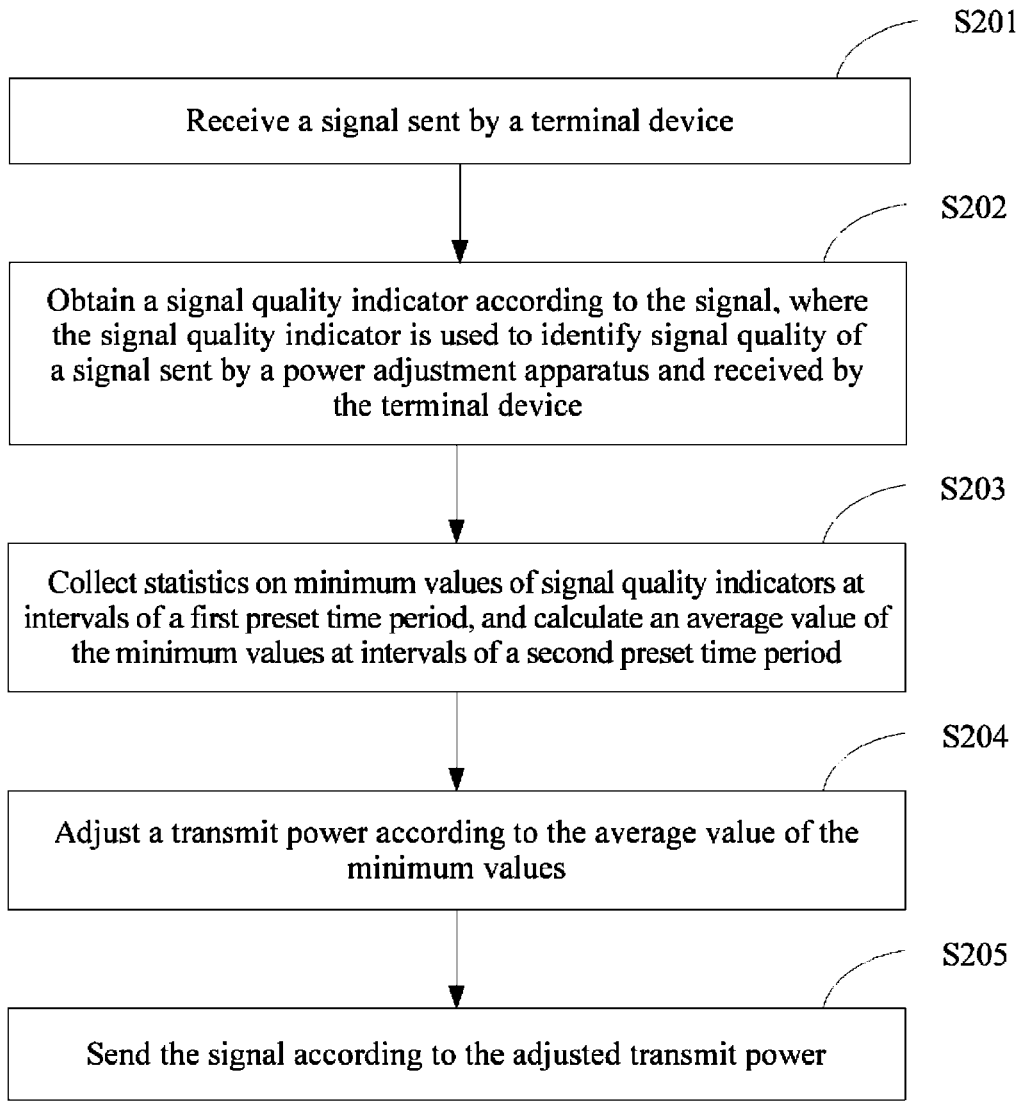
FIG. 2 is a flowchart of another implementation manner of a power adjustment method according to this application.

Referring to FIG. 2, FIG. 2 is a flowchart of another implementation manner of a power adjustment method according to this application. This implementation manner is described from the perspective of a power adjustment apparatus. The power adjustment apparatus may be a gateway or a router. This implementation manner includes the following steps:

This implementation manner is similar to the foregoing implementation manner, and differences lie in steps S203 to S204. For steps S201 to S202, refer to steps S101 to S102 and related descriptions, and details are not described repeatedly herein.

S203: Collect statistics on minimum values of signal quality indicators at intervals of a first preset time period, and calculate an average value of the minimum values at intervals of a second preset time period.

The power adjustment apparatus determines the minimum values of signal quality indicators at intervals of the first preset time period, and calculates the average value of the minimum values at intervals of the second preset time period. Each second preset time period corresponds to an average value of the minimum values. Average values may be arranged in temporal order, and an average value arranged at the bottom is a current average value.

For example, a minimum value of the signal quality indicators of the signal received by the terminal device is determined every five seconds, and in every minute, an average value of 12 minimum values within the minute is calculated. In this implementation manner, the first preset time period is five seconds, and the second preset time period is one minute. It can be understood that, in another implementation manner, the first preset time period and the second preset time period may be set to other time values.

S204: Adjust a transmit power according to the average value of the minimum values.

After obtaining the current average value of the minimum values, the power adjustment apparatus compares the average value of the minimum values with a preset threshold, adjusts the transmit power according to a comparison result, and uses the adjusted transmit power as a final transmit power.

When the signal quality indicator is a signal quality value, if the power adjustment apparatus determines that the average value of the minimum values is less than the preset threshold, the power adjustment apparatus increases the transmit power based on the original transmit power; if the power adjustment apparatus determines that the average value of the minimum values is greater than or equal to the preset threshold, the power adjustment apparatus does not adjust the transmit power. When the signal quality indicator is a noise quality value, if the power adjustment apparatus determines that the average value of the minimum values is less than or equal to the preset threshold, the power adjustment apparatus does not adjust the transmit power; if the power adjustment apparatus determines that the average value of the minimum values is greater than the preset threshold, the power adjustment apparatus increases the transmit power based on the original transmit power.

For example, when the signal quality indicator is a signal quality value, and the preset threshold is 90, if the obtained average value of the minimum values is 95, the power adjustment apparatus determines that the current average value of the minimum values is greater than the preset threshold, and does not adjust the transmit power, that is, maintains the default preset transmit power; if the obtained average value of the minimum values is 60, the power adjustment apparatus determines that the current average value of the minimum values is less than the preset threshold, and increases the transmit power based on the default preset transmit power; if the obtained average value of the minimum values is 90, the power adjustment apparatus determines that the current average value of the minimum values is equal to the preset threshold, and adjusts the current transmit power to the default preset transmit power.

When the signal quality indicator is a noise quality value, and the preset threshold is 10, if the obtained average value of the minimum values is 5, the power adjustment apparatus determines that the current average value of the minimum values is less than the preset threshold, and does not adjust the transmit power, that is, maintains the default preset transmit power; if the obtained average value of the minimum values is 20, the power adjustment apparatus determines that the current average value of the minimum values is greater than the preset threshold, and increases the transmit power based on the default preset transmit power; if the obtained average value of the minimum values is 5, the power adjustment apparatus determines that the current average value of the minimum values is equal to the preset threshold, and adjusts the current transmit power to the default preset transmit power.

The power adjustment apparatus uses the adjusted transmit power as the final transmit power.

It can be understood that, the transmit power that has been increased does not exceed a maximum value that is allowed for normal operation of the power adjustment apparatus, and the default preset transmit power, the preset threshold, and a value by which the transmit power is increased may be set according to an actual requirement and are not limited herein.

It can be understood that, in this implementation manner, only one preset threshold is set, and in another implementation manner, at least two preset thresholds may be set. The at least two thresholds form at least three intervals, and each interval corresponds to a value by which the transmit power needs to be increased or reduced. The transmit power is adjusted according to a range to which the signal quality indicator belongs. The preset threshold and the value, by which the transmit power needs to be increased or reduced, corresponding to each interval are set according to an actual requirement.

S205: Send a signal according to the adjusted transmit power.

The power adjustment apparatus sends the signal according to the adjusted transmit power, to communicate with the terminal device in a network.

In the foregoing solution, a signal quality indicator is obtained according to a signal sent by a terminal device; minimum values of signal quality indicators are counted at intervals of a first preset time period, and at intervals of a second preset time period, an average value of the minimum values of the signal quality indicators within the second preset time period is calculated; and a transmit power is adjusted according to the current average value of the minimum values of the signal quality indicators. In this way, a power adjustment apparatus can dynamically adjust a transmit power according to a signal quality indicator of a signal received by the terminal device, and even if a signal sent by the power adjustment apparatus is affected by ambient interference and signal strength attenuates due to blocking by an obstruction such as a wall, receiving performance of the terminal device can still be ensured, which can improve communication reliability.

Figure 3:
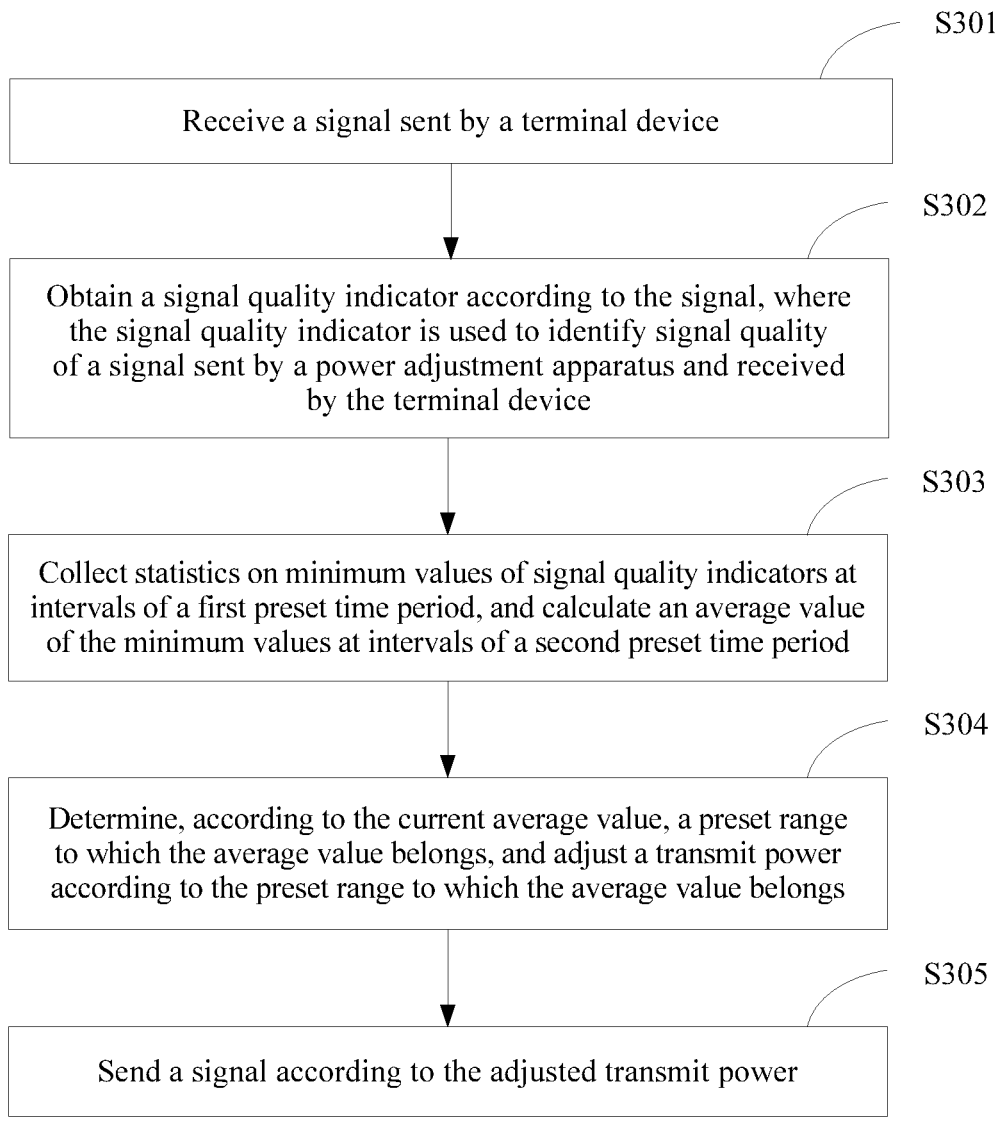
FIG. 3 is a flowchart of still another implementation manner of a power adjustment method according to this application.

Referring to FIG. 3, FIG. 3 is a flowchart of still another implementation manner according to this application. This implementation manner is described from the perspective of a power adjustment apparatus. The power adjustment apparatus may be a gateway or a router. This implementation manner includes the following steps:

This implementation manner is similar to the foregoing implementation manner, and a difference lies in step S304. For steps S301 to S303 and S305, refer to steps S201 to S203 and S205 and related descriptions, and details are not described repeatedly herein.

S304: Determine, according to the current average value, a preset range to which the average value belongs, and adjust a transmit power according to the preset range to which the average value belongs, where the preset range includes at least two subranges arranged according to a preset rule, and each subrange corresponds to a transmit power.

After obtaining the current average value of the minimum values, the power adjustment apparatus determines, according to the current average value of the minimum values, the preset range to which the current average value of the minimum values belongs, and adjusts the transmit power according to the preset range to which the current average value of the minimum values belongs, where the preset range includes at least two subranges arranged according to a preset rule, and each subrange corresponds to a transmit power.

For example, when the signal quality indicator is a signal quality value, a first subrange is [100, 70], and a transmit power corresponding to the first subrange is the default preset transmit power (for example, the default preset transmit power is 13 decibel milliwatts (dBm)); a second subrange is [69, 50], and a transmit power corresponding to the second subrange is 14 dBm; a third subrange is [49, 30], and a transmit power corresponding to the third subrange is 15 dBm; a fourth subrange is [29, 10], and a transmit power corresponding to the fourth subrange is 16 dBm; and a fifth subrange is less than 10, and a transmit power corresponding to the fifth subrange is 17 dBm.

If the current average value of the minimum values is 90, the power adjustment apparatus determines that the average value belongs to the first subrange, and does not adjust the transmit power, that is, maintains the default preset transmit power 13 dBm.

If the current average value of the minimum values is 60, the power adjustment apparatus determines that the average value belongs to the second subrange, and adjusts the current transmit power to 14 dBm.

If the current average value of the minimum values is 45, the power adjustment apparatus determines that the average value belongs to the third subrange, and adjusts the current transmit power to 15 dBm.

If the current average value of the minimum values is 20, the power adjustment apparatus determines that the average value belongs to the fourth subrange, and adjusts the current transmit power to 16 dBm.

If the current average value of the minimum values is 8, the power adjustment apparatus determines that the average value belongs to the fifth subrange, and adjusts the current transmit power to 17 dBm.

When the signal quality indicator is a noise quality value, a first subrange is [100, 70], and a transmit power corresponding to the first subrange is 17 dBm; a second subrange is [69, 50], and a transmit power corresponding to the second subrange is 16 dBm; a third subrange is [49, 30], and a transmit power corresponding to the third subrange is 15 dBm; a fourth subrange is [29, 10], and a transmit power corresponding to the fourth subrange is 14 dBm; and a fifth subrange is less than 10, and a transmit power corresponding to the fifth subrange is the default preset transmit power (for example, the default preset transmit power is 13 dBm).

If the current average value of the minimum values is 90, the power adjustment apparatus determines that the average value belongs to the first subrange, and adjusts the current transmit power to 17 dBm.

If the current average value of the minimum values is 60, the power adjustment apparatus determines that the average value belongs to the second subrange, and the power adjustment apparatus adjusts the current transmit power to 16 dBm.

If the current average value of the minimum values is 45, the power adjustment apparatus determines that the average value belongs to the third subrange, and the power adjustment apparatus adjusts the current transmit power to 15 dBm.

If the current average value of the minimum values is 20, the power adjustment apparatus determines that the average value belongs to the fourth subrange, and the power adjustment apparatus adjusts the current transmit power to 14 dBm.

If the current average value of the minimum values is 8, the power adjustment apparatus determines that the average value belongs to the fifth subrange, and the power adjustment apparatus does not adjust the transmit power, that is, maintains the default preset transmit power 13 dBm.

It can be understood that, five subranges are set in this implementation manner, and the five subranges are arranged according to a preset rule of descending order. In another implementation manner, the at least two subranges may be arranged according to another preset rule, and a transmit power value corresponding to each subrange may be set according to an actual situation, and is not limited to the transmit power value corresponding to each of the five subranges disclosed in this implementation manner.

In the foregoing solution, a signal quality indicator is obtained according to a signal sent by a terminal device; minimum values of signal quality indicators are counted at intervals of a first preset time period, and at intervals of a second preset time period, an average value of the minimum values of the signal quality indicators within the second preset time period is calculated; and a transmit power is adjusted according to a preset range to which the average value belongs. In this way, a power adjustment apparatus can dynamically adjust a transmit power according to a signal quality indicator of a signal received by the terminal device, and even if a signal sent by the power adjustment apparatus is affected by ambient interference and signal strength attenuates due to blocking by an obstruction such as a wall, receiving performance of the terminal device can still be ensured, which can improve communication reliability.

Figure 4:
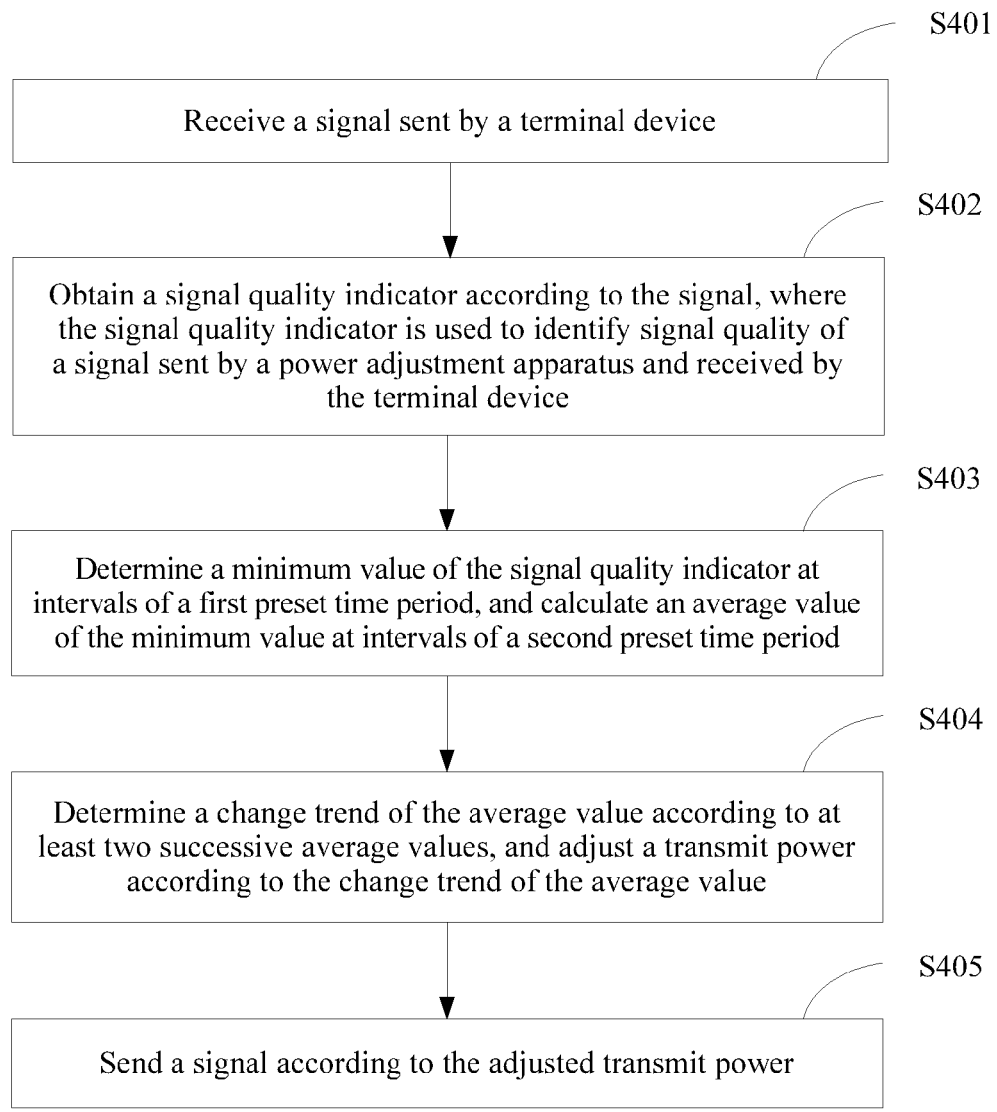
FIG. 4 is a flowchart of yet another implementation manner of a power adjustment method according to this application.

Referring to FIG. 4, FIG. 4 is a flowchart of yet another implementation manner according to this application. This implementation manner is described from the perspective of a power adjustment apparatus. The power adjustment apparatus may be a gateway or a router. A signal quality indicator is a signal quality value. This implementation manner includes the following steps:

This implementation manner is similar to the foregoing implementation manner, and a difference lies in step S404. For steps S401 to S403 and S405, refer to steps S201 to S203 and S205 and related descriptions, and details are not described repeatedly herein.

S404: Determine a change trend of the average value according to at least two successive average values, and adjust a transmit power according to the change trend of the average value.

When the signal quality indicator is a signal quality value, after the power adjustment apparatus obtains the current average value of the minimum values, the power adjustment apparatus determines the change trend of the average value according to at least two successive average values of the minimum values, and adjusts the transmit power according to the change trend of the average value of the minimum values, where the change trend includes an upward trend, a steady trend, and a downward trend.

If in two successive average values of the minimum values, the second average value of the minimum values is greater than the first average value of the minimum values, the power adjustment apparatus determines that the change trend of the average value of the minimum values is the upward trend.

If in two successive average values of the minimum values, the second average value of the minimum values is equal to the first average value of the minimum values, the power adjustment apparatus determines that the change trend of the average value of the minimum values is the steady trend.

If in two successive average values of the minimum values, the second average value of the minimum values is less than the first average value of the minimum values, the power adjustment apparatus determines that the change trend of the average value of the minimum values is the downward trend.

In this implementation manner, the change trend of the average value of the minimum values is determined by comparing the second average value of the minimum values with the first average value of the minimum values, a transmit power corresponding to the first average value of the minimum values is used as a current transmit power, and the transmit power is increased or reduced based on the current transmit power according to the change trend of the average value of the minimum values. A value by which the transmit power is increased or reduced may be set according to an actual situation.

For example, if in two successive average values of the minimum values, the first average value of the minimum values and the second average value of the minimum values are both 100, the power adjustment apparatus determines that the second average value 100 of the minimum value is a current average value, and that the change trend of the average value of the minimum values is the steady trend; in this case, the power adjustment apparatus does not adjust the transmit power, that is, maintains the default preset transmit power.

If in two successive average values of the minimum values, the first average value of the minimum values is 80, and the second average value of the minimum values is 60, the power adjustment apparatus determines that the second average value 60 of the minimum value is a current average value, and that the change trend of the average value of the minimum values is the downward trend; in this case, a transmit power corresponding to the average value 80 of the minimum value is a current transmit power. Because the change trend of the average value of the minimum values is the downward trend, the power adjustment apparatus increases the transmit power based on the current transmit power, and uses the adjusted transmit power as a final transmit power. It can be understood that, the transmit power that has been increased does not exceed a maximum value that is allowed for normal operation of the power adjustment apparatus.

If in two successive average values of the minimum values, the first average value of the minimum values is 60, and the second average value of the minimum values is 90, the power adjustment apparatus determines that the second average value 90 of the minimum value is a current average value, and that the change trend of the average value of the minimum values is the upward trend; in this case, a transmit power corresponding to the average value 60 of the minimum value is a current transmit power. Because the change trend of the average value of the minimum values is the upward trend, the power adjustment apparatus reduces the transmit power based on the current transmit power, and uses the adjusted transmit power as a final transmit power.

If in two successive average values of the minimum values, the first average value of the minimum values is 60, and the second average value of the minimum values is 100, the power adjustment apparatus determines that the second average value 100 of the minimum value is a current average value, and that the change trend of the average value of the minimum values of the minimum value is the upward trend; in this case, a transmit power corresponding to the average value 60 of the minimum value is a current transmit power. Because the change trend of the average value of the minimum values is the upward trend, and a preset transmit power corresponding to the average value 100 of the minimum value is the default preset transmit power, the power adjustment apparatus adjusts the current transmit power to the default preset transmit power, and uses the adjusted transmit power as a final transmit power.

It can be understood that, in this implementation manner, the change trend of the average value is determined according to two successive average values of the minimum values. In another implementation manner, multiple successive average values of the minimum values may be selected to determine the change trend of the average value, so as to more accurately determine the change trend of the average value and improve control accuracy of the power adjustment apparatus.

In the foregoing solution, a signal quality indicator is obtained according to a signal sent by a terminal device; minimum values of signal quality indicators are counted at intervals of a first preset time period, and at intervals of a second preset time period, an average value of the minimum values of the signal quality indicators within the second preset time period is calculated; and a transmit power is adjusted according to a change trend of the current average value of the minimum values of the signal quality indicators. In this way, a power adjustment apparatus can dynamically adjust a transmit power according to a received signal quality indicator of the terminal device, and even if a signal sent by the power adjustment apparatus is affected by ambient interference and signal strength attenuates due to blocking by an obstruction such as a wall, receiving performance of the receiving device can still be ensured, which can improve communication reliability.

Figure 5:
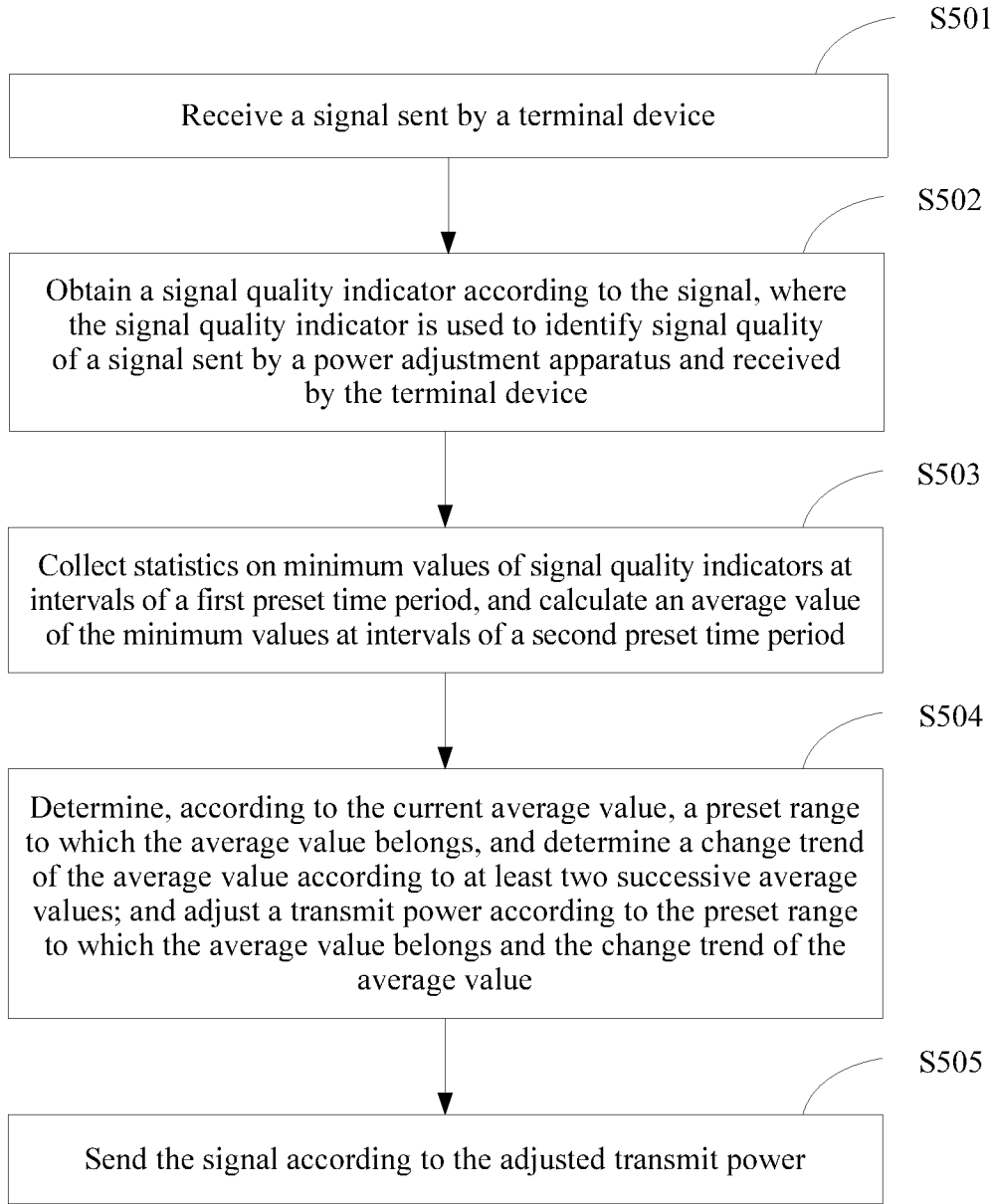
FIG. 5 is a flowchart of still another implementation manner of a power adjustment method according to this application.

Referring to FIG. 5, FIG. 5 is a flowchart of still another implementation manner according to this application. This implementation manner is described from the perspective of a power adjustment apparatus. The power adjustment apparatus may be a gateway or a router. A signal quality indicator is a signal quality value. This implementation manner includes the following steps:

This implementation manner is similar to the foregoing implementation manner, and a difference lies in step S504. For steps S501 to S504 and S504, refer to steps S201 to S204 and S205 and related descriptions, and details are not described repeatedly herein.

S504: Determine, according to the current average value, a preset range to which the average value belongs, and determine a change trend of the average value according to at least two successive average values; and adjust a transmit power according to the preset range to which the average value belongs and the change trend of the average value.

When the signal quality indicator is a signal quality value, after the power adjustment apparatus obtains the current average value of the minimum values, the power adjustment apparatus determines, according to the current average value of the minimum values, the preset range to which the current average value of the minimum values belongs, determines the change trend of the average value of the minimum values according to at least two successive average values of the minimum values, and adjusts the transmit power according to the preset range to which the current average value of the minimum values belongs and the change trend of the average value of the minimum values. The preset range includes at least two subranges arranged in descending order, and each subrange corresponds to a transmit power. The change trend includes an upward trend, a steady trend, and a downward trend. It can be understood that, in this implementation manner, the at least two subranges may be arranged according to a preset rule of descending order. In another implementation manner, the at least two subranges may be arranged according to another preset rule.

If in two successive average values of the minimum values, the second average value of the minimum values is greater than the first average value of the minimum values, the power adjustment apparatus determines that the change trend of the average value of the minimum values is the upward trend.

If in two successive average values of the minimum values, the second average value of the minimum values is equal to the first average value of the minimum values, the power adjustment apparatus determines that the change trend of the average value of the minimum values is the steady trend.

If in two successive average values of the minimum values, the second average value of the minimum values is less than the first average value of the minimum values, the power adjustment apparatus determines that the change trend of the average value of the minimum values is the downward trend.

For example, a first subrange is [100, 70], and a transmit power corresponding to the first subrange is the default preset transmit power (for example, the default preset transmit power is 13 dBm); a second subrange is [69, 30], and a transmit power corresponding to the second subrange is 14 dBm; and a third subrange is less than 30, and a transmit power corresponding to the third subrange is 15 dBm.

If in two successive average values of the minimum values, the second average value of the minimum values belongs to the first preset range, whether the change trend of the average value of the minimum values is the upward trend or the steady trend or the downward trend, the power adjustment apparatus does not adjust the transmit power, and maintains the transmit power 13 dBm.

If in two successive average values of the minimum values, the second average value of the minimum values belongs to the second subrange, if the change trend of the average value of the minimum values is the upward trend, the power adjustment apparatus reduces the transmit power by 1 dBm based on 14 dBm; if the change trend of the average value of the minimum values is the steady trend, the power adjustment apparatus does not adjust the transmit power, and maintains the transmit power 14 dBm; if the change trend of the average value of the minimum values is the downward trend, the power adjustment apparatus increases the transmit power by 1 dBm based on 14 dBm.

If in two successive average values of the minimum values, the second average value of the minimum values belongs to the third subrange, if the change trend of the average value of the minimum values is the upward trend, the power adjustment apparatus reduces the transmit power by 2 dBm based on 15 dBm; if the change trend of the average value of the minimum values is the steady trend, the power adjustment apparatus does not adjust the transmit power, and maintains the transmit power 15 dBm; if the change trend of the average value of the minimum values is the downward trend, the power adjustment apparatus increases the transmit power by 2 dBm based on 15 dBm. It can be understood that, the transmit power that has been increased does not exceed a maximum value that is allowed for normal operation of the power adjustment apparatus.

In this implementation manner, if two successive average values of the minimum values belong to a same subrange, the power adjustment apparatus increases or reduces, according to a change trend of the second average value of the minimum values, the transmit power based on a transmit power corresponding to the first average value of the minimum values. If two successive average values of the minimum values belong to different subranges, the power adjustment apparatus increases or reduces, according to an range to which the second average value of the minimum values belongs and a change trend of the second average value, the transmit power based on a transmit power corresponding to the interval.

For example, if in two successive average values of the minimum values, the first average value of the minimum values and the second average value of the minimum values are both 100, the power adjustment apparatus determines that a current average value is 100, that the current average value belongs to the first subrange, and that a change trend of the current average value is the steady trend. In this case, because the current average value belongs to the first subrange, a preset transmit power corresponding to the first subrange is 13 dBm, and the change trend of the average value of the minimum values is the steady trend, the power adjustment apparatus does not adjust the transmit power, that is, maintains the default preset transmit power 13 dBm.

If in two successive average values of the minimum values, the first average value of the minimum values is 80, and the second average value of the minimum values is 70, the power adjustment apparatus determines that a current average value is 70, that the current average value belongs to the first subrange, and that a change trend of the current average value is the downward trend. In this case, because the current average value belongs to the first subrange, a preset transmit power corresponding to the first subrange is 13 dBm, and the change trend of the average value of the minimum values is the downward trend, the power adjustment apparatus does not adjust the transmit power, that is, maintains the default preset transmit power 13 dBm.

If in two successive average values of the minimum values, the first average value of the minimum values is 80, and the second average value of the minimum values is 85, the power adjustment apparatus determines that the second average value 85 of the minimum value is a current average value, that the second average value of the minimum values belongs to the first subrange, and that a change trend of the second average value is the upward trend. In this case, because the current average value belongs to the first subrange, a preset transmit power corresponding to the first subrange is 13 dBm, and the change trend of the average value of the minimum values is the downward trend, the power adjustment apparatus does not adjust the transmit power, that is, maintains the default preset transmit power 13 dBm.

If in two successive average values of the minimum values, the first average value of the minimum values is 70, and the second average value of the minimum values is 65, the power adjustment apparatus determines that a current average value is 65, that the current average value belongs to the second subrange, and that a change trend of the current average value is the downward trend. In this case, because the first average value of the minimum values belongs to the first subrange, the current average value belongs to the second subrange, a preset transmit power corresponding to the second subrange is 14 dBm, and the change trend of the average value of the minimum values is the downward trend, the power adjustment apparatus increases the transmit power by 1 dBm based on 14 dBm, and uses 15 dBm as a final transmit power.

If in two successive average values of the minimum values, the first average value of the minimum values is 50, and the second average value of the minimum values is 65, the power adjustment apparatus determines that a current average value is 65, that the current average value belongs to the second subrange, and that a change trend of the current average value is the upward trend. In this case, because the first average value of the minimum values and the current average value both belong to the second subrange, a preset transmit power corresponding to the second subrange is 14 dBm, and the change trend of the average value of the minimum values is the upward trend, the power adjustment apparatus reduces the transmit power by 1 dBm based on 14 dBm, and uses 13 dBm as a final transmit power.

If in two successive average values of the minimum values, the first average value of the minimum values is 65, and the second average value of the minimum values is 65, the power adjustment apparatus determines that a current average value is 65, that the current average value belongs to the second subrange, and that a change trend of the current average value is the steady trend. In this case, because the first average value of the minimum values and the current average value both belong to the second subrange, the change trend of the average value of the minimum values is the steady trend, and the transmit power 14 dBm corresponding to the first average value 65 of the minimum value is a current transmit power, the power adjustment apparatus does not adjust the transmit power, and uses the current transmit power 14 dBm as a final transmit power.

If in two successive average values of the minimum values, the first average value of the minimum values is 65, and the second average value of the minimum values is 45, the power adjustment apparatus determines that a current average value is 45, that the current average value belongs to the second subrange, and that a change trend of the current average value is the downward trend. In this case, because the first average value of the minimum values and the current average value both belong to the second subrange, the change trend of the average value of the minimum values is the downward trend, and the transmit power 14 dBm corresponding to the first average value 65 of the minimum value is a current transmit power, the power adjustment apparatus increases the transmit power by 1 dBm based on 14 dBm, and uses 15 dBm as a final transmit power.

If in two successive average values of the minimum values, the first average value of the minimum values is 45, and the second average value of the minimum values is 40, the power adjustment apparatus determines that a current average value is 40, that the current average value belongs to the second subrange, and that a change trend of the current average value is the downward trend. In this case, the first average value of the minimum values and the current average value both belong to the second subrange, and the change trend of the average value of the minimum values is the downward trend. Besides, because the power adjustment apparatus adjusts a final transmit power corresponding to the average value 65 of the minimum value to 15 dBm in a previous power adjustment process, in a current power adjustment process, the transmit power 15 dBm corresponding to the first average value 65 of the minimum value is a current transmit power. Therefore, the power adjustment apparatus increases the transmit power by 1 dBm based on 15 dBm, and uses 16 dBm as a final transmit power.

The rest can be deduced by analogy, and details are not described herein.

In this implementation manner, the change trend of the average value is determined according to two successive average values of the minimum values. In another implementation manner, multiple successive average values of the minimum values may be selected to determine the change trend of the average value, so as to more accurately determine the change trend of the average value, adjust the transmit power according to the change trend of the average value, and improve control accuracy of the power adjustment apparatus. A value by which the transmit power is increased or reduced may be set according to an actual situation.

In the foregoing solution, a signal quality indicator is obtained according to a signal sent by a terminal device; minimum values of signal quality indicators are counted at intervals of a first preset time period, and at intervals of a second preset time period, an average minimum values of the signal quality indicators within the second preset time period is calculated; and a transmit power is adjusted according to a preset range to which the average value belongs and a change trend of the current average value. In this way, a power adjustment apparatus can dynamically adjust a transmit power according to a received signal quality indicator of the terminal device, which improves sensitivity and accuracy of power adjustment, and even if a signal sent by the power adjustment apparatus is affected by ambient interference and signal strength attenuates due to blocking by an obstruction such as a wall, receiving performance of the terminal device can still be ensured, which can improve communication reliability.

Figure 6:
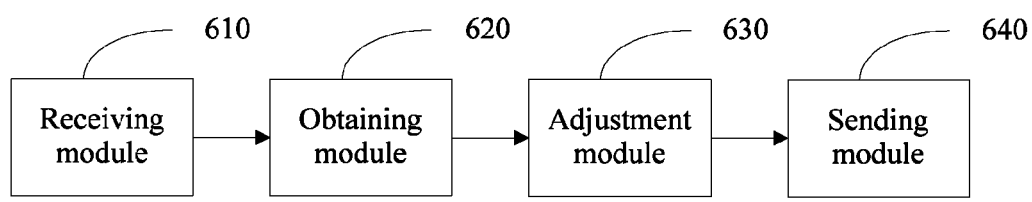
FIG. 6 is a schematic structural diagram of an implementation manner of a power adjustment apparatus according to this application.

Referring to FIG. 6, FIG. 6 is a schematic structural diagram of an implementation manner of a power adjustment apparatus according to this application. The power adjustment apparatus in this implementation manner includes a receiving module 610, an obtaining module 620, an adjustment module 630, and a sending module 640.

The receiving module 610 is configured to receive a signal sent by a terminal device.

For example, after starting, the power adjustment apparatus operates at a default preset transmit power. When needing to access the power adjustment apparatus, the terminal device sends a signal to the power adjustment apparatus, to request to access the power adjustment apparatus; or after the terminal already accesses the power adjustment apparatus, the terminal may perform signal interaction with the power adjustment apparatus. The receiving module 610 receives the signal sent by the terminal device.

Specifically, in this embodiment of the present disclosure, the receiving module 610 receives the signal sent by the terminal device. It should be understood that, the signal is a transmission form of a message sent by the terminal device, and is a carrier of the transmitted message. For example, in this embodiment, the signal may be an electrical signal. It should be further understood that, the signal sent by the terminal device is a message in essence. The message is content to be transmitted in the signal, and is the essence of the signal. That is, in this embodiment of the present disclosure, a relationship between the signal and the message is a relationship between carrier and content and between form and essence. In other words, that the receiving module 610 receives the signal sent by the terminal device includes that the receiving module 610 receives the message sent by the terminal device. The latter is a specific implementation manner of the former, and is also an implementation manner that better reflects the essence. When the receiving module 610 receives the message sent by the terminal device, the message may be a control frame, a management frame, or a data frame.

The control frame includes: an ACK frame, an RTS frame, a CTS frame, a PS-poll frame, or the like. The management frame includes: a probe request frame, a beacon frame, an authentication frame, a deauthentication frame, or the like. In a process in which the power adjustment apparatus establishes a connection to the terminal device, the power adjustment apparatus receives a management frame or a control frame sent by the terminal device; when performing data transmission after establishing a connection to the terminal device, the power adjustment apparatus receives a data frame sent by the terminal device. In the process in which the power adjustment apparatus establishes a connection to the terminal device, the receiving module 610 receives the management frame or the control frame sent by the terminal device; when the power adjustment apparatus performs data transmission after establishing a connection to the terminal device, the receiving module 610 receives the data frame sent by the terminal device.

The receiving module 610 sends the received signal to the obtaining module 620.

The obtaining module 620 is configured to obtain a signal quality indicator according to the signal received by the receiving module 610, where the signal quality indicator is used to identify signal quality of a signal sent by the power adjustment apparatus and received by the terminal device. A signal quality value is used to identify quality of the signal sent by the power adjustment apparatus and received by the terminal device, and a noise quality value is used to identify noise of the signal received by the terminal device.

For example, after receiving the signal sent by the receiving module 610, the obtaining module 620 obtains, according to the signal, a signal quality indicator of a signal received by the terminal device, where the signal quality indicator is used to identify signal quality of the signal sent by the power adjustment apparatus and received by the terminal device, that is, the signal quality indicator is used to identify signal quality of the signal received by the terminal device. The signal quality indicator may include a signal quality value or a noise quality value. The signal quality value is used to identify quality of the signal sent by the power adjustment apparatus and received by the terminal device. The signal quality value may include a channel quality value and a signal strength value. The noise quality value is used to identify noise of the signal received by the terminal device. The noise quality value may include a signal strength value of a noise signal. In this implementation manner, the adjustment module 620 measures, by using the signal quality indicator, the signal quality of the signal received by the terminal device. When the signal quality indicator is a signal quality value, a larger value of the signal quality indicator indicates better signal quality of the signal received by the terminal device; when the signal quality indicator is a noise quality value, a larger value of the signal quality indicator indicates greater signal strength of the noise signal in the signal received by the terminal device and poorer signal quality.

For example, when the signal quality indicator is a signal quality value, if the signal quality indicator is 100, it indicates that the signal quality of the signal received by the terminal device is a preset ideal reference value; if the signal quality indicator is 90, it indicates that the signal quality of the signal received by the terminal device is 90% of the preset ideal reference value.

When the signal quality indicator is a noise quality value, if the signal quality indicator is 100, it indicates that the entire received signal is the noise signal, and the signal quality of the received signal is 0%; if the signal quality indicator is 90, it indicates that 90% of the received signal is the noise signal, and the signal quality is 10% of the preset ideal reference value.

The obtaining module 620 sends the obtained signal quality indicator to the adjustment module.

The adjustment module 630 is configured to adjust a transmit power according to the signal quality indicator after the obtaining module 620 obtains the signal quality indicator. For example, after obtaining the signal quality indicator sent by the obtaining module 620, the adjustment module 630 compares the signal quality indicator with a preset threshold, adjusts the transmit power according to a comparison result, and uses the adjusted transmit power as a final transmit power.

When the signal quality indicator is a signal quality value, if the signal quality indicator is less than the preset threshold, the transmit power is increased based on the original transmit power; if the signal quality indicator is greater than or equal to the preset threshold, the transmit power is not adjusted.

When the signal quality indicator is a noise quality value, if the signal quality indicator is less than or the preset threshold, the transmit power is not adjusted; if the signal quality indicator is greater than the preset threshold, the transmit power is increased based on the original transmit power.

For example, when the signal quality indicator is a signal quality value, and the preset threshold is 90, if the obtained signal quality indicator is 95, the adjustment module 630 determines that the current signal quality indicator is greater than the preset threshold, and does not adjust the transmit power, that is, maintains the default preset transmit power. If the obtained signal quality indicator is 60, the adjustment module 630 determines that the current signal quality indicator is less than the preset threshold, and increases the transmit power based on the default preset transmit power. If the obtained signal quality indicator is 90, the adjustment module 630 determines that the current signal quality indicator is equal to the preset threshold, and adjusts the current transmit power to the default preset transmit power.

When the signal quality indicator is a noise quality value, and the preset threshold is 10, if the obtained signal quality indicator is 5, the adjustment module 630 determines that the current signal quality indicator is less than the preset threshold, and does not adjust the transmit power, that is, maintains the default preset transmit power; if the obtained signal quality indicator is 20, the adjustment module 630 determines that the current signal quality indicator is greater than the preset threshold, and increases the transmit power based on the default preset transmit power; if the obtained signal quality indicator is 5, the adjustment module 630 determines that the current signal quality indicator is equal to the preset threshold, and adjusts the current transmit power to the default preset transmit power.

The adjustment module 630 uses the adjusted transmit power as the final transmit power.

It can be understood that, the transmit power that has been increased does not exceed a maximum value that is allowed for normal operation of the power adjustment apparatus, and the default preset transmit power, the preset threshold, and a value by which the transmit power is increased may be set according to an actual requirement and are not limited herein.

It can be understood that, in this implementation manner, only one preset threshold is set, and in another implementation manner, at least two preset thresholds may be set. The at least two thresholds form at least three intervals, and each interval corresponds to a value by which the transmit power needs to be increased or reduced. The transmit power is adjusted according to a range to which the signal quality indicator belongs.

The adjustment module 630 sends a value of the adjusted transmit power to the sending module 640.

The sending module 640 is configured to send a signal according to the transmit power adjusted by the adjustment module 630. For example, the sending module 640 receives the value of the adjusted transmit power sent by the adjustment module 630, and sends the signal according to the adjusted transmit power, to communicate with the terminal device in a network.

In the foregoing solution, a signal quality indicator is obtained according to a signal sent by a terminal device, and a transmit power is adjusted according to the signal quality indicator. In this way, a power adjustment apparatus can dynamically adjust a transmit power according to a signal quality indicator of a signal received by the terminal device, and even if a signal sent by the power adjustment apparatus is affected by ambient interference and signal strength attenuates due to blocking by an obstruction such as a wall, receiving performance of the terminal device can still be ensured, which can improve communication reliability.

Figure 7:
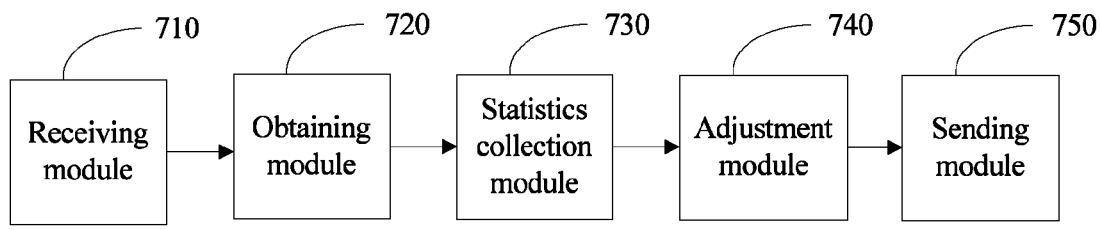
FIG. 7 is a schematic structural diagram of another implementation manner of a power adjustment apparatus according to this application.

Referring to FIG. 7, FIG. 7 is a schematic structural diagram of another implementation manner of a power adjustment apparatus according to this application. The power adjustment apparatus in this implementation manner includes a receiving module 710, an obtaining module 720, a statistics collection module 730, an adjustment module 740, and a sending module 750.

The power adjustment apparatus in this implementation manner is similar to the power adjustment apparatus in the foregoing implementation manner, and a difference lies in that the statistics collection module 730 is added. Functions of the receiving module 710, the obtaining module 720, and the sending module 750 are respectively basically the same as those of the receiving module 610, the obtaining module 620, and the sending module 640 in the foregoing implementation manner. Refer to related descriptions of the foregoing implementation manner, and details are not described repeatedly herein.

The statistics collection module 730 is configured to collect statistics on minimum values of signal quality indicators at intervals of a first preset time period, and calculate an average value of the minimum values of signal quality indicators at intervals of a second preset time period.

For example, the statistics collection module 730 determines the minimum values of signal quality indicators at intervals of the first preset time period, and calculates the average value of the minimum values at intervals of the second preset time period. Each second preset time period corresponds to an average value of the minimum values. Average values are arranged in temporal order, and an average value arranged at the bottom is a current average value.

For example, the statistics collection module 730 determines, every five seconds, a minimum value of the signal quality indicators of the signal received by the terminal device, and calculates, in every minute, an average value of 12 minimum values within the minute. In this implementation manner, the first preset time period is five seconds, and the second preset time period is one minute. It can be understood that, in another implementation manner, the first preset time period and the second preset time period may be set to other time values. The statistics collection module 730 sends the average value of the minimum values to the adjustment module 740.

The adjustment module 740 is specifically configured to adjust a transmit power according to the average value of the minimum values after the statistics collection module 730 obtains the average value of the minimum values.

For example, after receiving the average value of the minimum values sent by the statistics collection module 730, the adjustment module 740 compares the average value of the minimum values with a preset threshold, adjusts the transmit power according to a comparison result, and uses the adjusted transmit power as a final transmit power.

When the signal quality indicator is a signal quality value, if the adjustment module 740 determines that the average value of the minimum values is less than the preset threshold, the adjustment module 740 increases the transmit power based on the original transmit power; if the adjustment module 740 determines that the average value of the minimum values is greater than or equal to the preset threshold, the adjustment module 740 transmits power based on the original transmit power.

When the signal quality indicator is a noise quality value, if the adjustment module 740 determines that the average value of the minimum values is less than or equal to the preset threshold, the adjustment module 740 does not adjust the transmit power; if the adjustment module 740 determines that the average value of the minimum values is greater than the preset threshold, the adjustment module 740 increases the transmit power based on the original transmit power.

For example, when the signal quality indicator is a signal quality value, and the preset threshold is 90, if the obtained average value of the minimum values is 95, the adjustment module 740 determines that the current average value of the minimum values is greater than the preset threshold, and does not adjust the transmit power, that is, maintains the default preset transmit power; if the obtained average value of the minimum values is 60, the adjustment module 740 determines that the current average value of the minimum values is less than the preset threshold, and increases the transmit power based on the default preset transmit power; if the obtained average value of the minimum values is 90, the adjustment module 740 determines that the current average value of the minimum values is equal to the preset threshold, and adjusts the current transmit power to the default preset transmit power.

When the signal quality indicator is a noise quality value, and the preset threshold is 10, if the obtained average value of the minimum values is 5, the adjustment module 740 determines that the current average value of the minimum values is less than the preset threshold, and does not adjust the transmit power, that is, maintains the default preset transmit power; if the obtained average value of the minimum values is 20, the adjustment module 740 determines that the current average value of the minimum values is greater than the preset threshold, and increases the transmit power based on the default preset transmit power; if the obtained average value of the minimum values is 5, the adjustment module 740 determines that the current average value of the minimum values is equal to the preset threshold, and adjusts the current transmit power to the default preset transmit power.

The adjustment module 740 uses the adjusted transmit power as the final transmit power, and sends a value of the adjusted transmit power to the sending module 750.

It can be understood that, the transmit power that has been increased does not exceed a maximum value that is allowed for normal operation of the power adjustment apparatus, and the default preset transmit power, the preset threshold, and a value by which the transmit power is increased may be set according to an actual requirement and are not limited herein.

It can be understood that, in this implementation manner, only one preset threshold is set, and in another implementation manner, at least two preset thresholds may be set. The at least two thresholds form at least three intervals, and each interval corresponds to a value by which the transmit power needs to be increased or reduced. The transmit power is adjusted according to a range to which the signal quality indicator belongs. The preset threshold and the value, by which the transmit power needs to be increased or reduced, corresponding to each interval are set according to an actual requirement.

In the foregoing solution, a signal quality indicator is obtained according to a signal sent by a terminal device; minimum values of signal quality indicators are counted at intervals of a first preset time period, and at intervals of a second preset time period, an average value of the minimum values of the signal quality indicators within the second preset time period is calculated; and a transmit power is adjusted according to a change trend of the current average value of the minimum values of the signal quality indicators. In this way, a power adjustment apparatus can dynamically adjust a transmit power according to a signal quality indicator of a signal received by the terminal device, and even if a signal sent by the power adjustment apparatus is affected by ambient interference and signal strength attenuates due to blocking by an obstruction such as a wall, receiving performance of the terminal device can still be ensured, which can improve communication reliability.

Still referring to FIG. 7, in another implementation manner, the adjustment module 740 is specifically configured to determine, according to the current average value, a preset range to which the average value belongs after the statistics collection module 730 obtains the average value of the minimum values, and adjust the transmit power according to the preset range to which the average value belongs, where the preset range includes at least two subranges arranged according to a preset rule, and each subrange corresponds to a transmit power.

For example, after receiving the average value of the minimum values sent by the statistics collection module 730, the adjustment module 740 determines, according to the current average value of the minimum values, the preset range to which the average value belongs, and adjusts the transmit power according to the preset range to which the current average value of the minimum values belongs, where the preset range includes at least two subranges arranged according to a preset rule, and each subrange corresponds to a transmit power.

For example, when the signal quality indicator is a signal quality value, a first subrange is [100, 70], and a transmit power corresponding to the first subrange is the default preset transmit power (for example, the default preset transmit power is 13 dBm); a second subrange is [69, 50], and a transmit power corresponding to the second subrange is 14 dBm; a third subrange is [49, 30], and a transmit power corresponding to the third subrange is 15 dBm; a fourth subrange is [29, 10], and a transmit power corresponding to the fourth subrange is 16 dBm; and a fifth subrange is less than 10, and a transmit power corresponding to the fifth subrange is 17 dBm.

If the current average value of the minimum values is 90, the adjustment module 740 determines that the average value belongs to the first subrange, and the adjustment module 740 does not adjust the transmit power, that is, maintains the default preset transmit power 13 dBm.

If the current average value of the minimum values is 60, the adjustment module 740 determines that the average value belongs to the second subrange, and the adjustment module 740 adjusts the current transmit power to 14 dBm.

If the current average value of the minimum values is 45, the adjustment module 740 determines that the average value belongs to the third subrange, and the adjustment module 740 adjusts the current transmit power to 15 dBm.

If the current average value of the minimum values is 20, the adjustment module 740 determines that the average value belongs to the fourth subrange, and the adjustment module 740 adjusts the current transmit power to 16 dBm.

If the current average value of the minimum values is 8, the adjustment module 740 determines that the average value belongs to the fifth subrange, and the adjustment module 740 adjusts the current transmit power to 17 dBm.

When the signal quality indicator is a noise quality value, a first subrange is [100, 70], and a transmit power corresponding to the first subrange is 17 dBm; a second subrange is [69, 50], and a transmit power corresponding to the second subrange is 16 dBm; a third subrange is [49, 30], and a transmit power corresponding to the third subrange is 15 dBm; a fourth subrange is [29, 10], and a transmit power corresponding to the fourth subrange is 14 dBm; and a fifth subrange is less than 10, and a transmit power corresponding to the fifth subrange is the default preset transmit power (for example, the default preset transmit power is 13 dBm).

If the current average value of the minimum values is 90, the adjustment module 740 determines that the average value belongs to the first subrange, and adjusts the current transmit power to 17 dBm.

If the current average value of the minimum values is 60, the adjustment module 740 determines that the average value belongs to the second subrange, and the power adjustment apparatus adjusts the current transmit power to 16 dBm.

If the current average value of the minimum values is 45, the adjustment module 740 determines that the average value belongs to the third subrange, and the power adjustment apparatus adjusts the current transmit power to 15 dBm.

If the current average value of the minimum values is 20, the adjustment module 740 determines that the average value belongs to the fourth subrange, and the power adjustment apparatus adjusts the current transmit power to 14 dBm.

If the current average value of the minimum values is 8, the adjustment module 740 determines that the average value belongs to the fifth subrange, and the power adjustment apparatus does not adjust the transmit power, that is, maintains the default preset transmit power 13 dBm.

It can be understood that, five subranges are set in this implementation manner, and the five subranges are arranged according to a preset rule of descending order. In another implementation manner, the at least two subranges may be arranged according to another preset rule, and a transmit power value corresponding to each subrange may be set according to an actual situation, and is not limited to the transmit power value corresponding to each of the five subranges disclosed in this implementation manner.

In the foregoing solution, a signal quality indicator is obtained according to a signal sent by a terminal device; minimum values of signal quality indicators are counted at intervals of a first preset time period, and at intervals of a second preset time period, an average value of the minimum values of the signal quality indicators within the second preset time period is calculated; and a transmit power is adjusted according to a preset range to which the average value belongs. In this way, a power adjustment apparatus can dynamically adjust a transmit power according to a signal quality indicator of a signal received by the terminal device, and even if a signal sent by the power adjustment apparatus is affected by ambient interference and signal strength attenuates due to blocking by an obstruction such as a wall, receiving performance of the receiving device can still be ensured, which can improve communication reliability.

Still referring to FIG. 7, in another implementation manner, when the signal quality indicator is a signal quality value, the adjustment module 740 is specifically configured to determine a change trend of the average value according to at least two successive average values after the statistics collection module 730 obtains the average value of the minimum values, and adjust a transmit power according to the change trend of the average value.

For example, when the signal quality indicator is a signal quality value, after receiving the average value of the minimum values sent by the statistics collection module 730, the adjustment module 740 determines the change trend of the average value according to at least two successive average values of the minimum values, and adjusts the transmit power according to the change trend of the average value of the minimum values, where the change trend includes an upward trend, a steady trend, and a downward trend.

If in two successive average values of the minimum values, the second average value of the minimum values is greater than the first average value of the minimum values, the adjustment module 740 determines that the change trend of the average value of the minimum values is the upward trend.

If in two successive average values of the minimum values, the second average value of the minimum values is equal to the first average value of the minimum values, the adjustment module 740 determines that the change trend of the average value of the minimum values is the steady trend.

If in two successive average values of the minimum values, the second average value of the minimum values is less than the first average value of the minimum values, the adjustment module 740 determines that the change trend of the average value of the minimum values is the downward trend.

In this implementation manner, the change trend of the current average value is determined by comparing the second average value of the minimum values with the first average value of the minimum values, a transmit power corresponding to the first average value of the minimum values is used as a current transmit power, and the transmit power is increased or reduced based on the current transmit power according to the change trend of the average value of the minimum values. A value by which the transmit power is increased or reduced may be set according to an actual situation.

For example, if in two successive average values of the minimum values, the first average value of the minimum values and the second average value of the minimum values are both 100, the adjustment module 740 determines that the second average value 100 of the minimum value is a current average value, and that the change trend of the average value of the minimum values is the steady trend; in this case, the adjustment module 740 does not adjust the transmit power, that is, maintains the default preset transmit power.

If in two successive average values of the minimum values, the first average value of the minimum values is 80, and the second average value of the minimum values is 60, the adjustment module 740 determines that the second average value 60 of the minimum value is a current average value, and that the change trend of the average value of the minimum values is the downward trend; in this case, a transmit power corresponding to the average value 80 of the minimum value is a current transmit power. Because the change trend of the average value of the minimum values is the downward trend, the adjustment module 740 increases the transmit power based on the current transmit power, and uses the adjusted transmit power as a final transmit power. It can be understood that, the transmit power that has been increased does not exceed a maximum value that is allowed for normal operation of the power adjustment apparatus.

If in two successive average values of the minimum values, the first average value of the minimum values is 60, and the second average value of the minimum values is 90, the adjustment module 740 determines that the second average value 90 of the minimum value is a current average value, and that the change trend of the average value of the minimum values is the upward trend; in this case, a transmit power corresponding to the average value 60 of the minimum value is a current transmit power. Because the change trend of the average value of the minimum values is the upward trend, the adjustment module 740 reduces the transmit power based on the current transmit power, and uses the adjusted transmit power as a final transmit power.

If in two successive average values of the minimum values, the first average value of the minimum values is 60, and the second average value of the minimum values is 100, the adjustment module 740 determines that the second average value 100 of the minimum value is a current average value, and that the change trend of the average value of the minimum values of the minimum value is the upward trend; in this case, a transmit power corresponding to the average value 60 of the minimum value is a current transmit power. Because the change trend of the average value of the minimum values is the upward trend, and a preset transmit power corresponding to the average value 100 of the minimum value is the default preset transmit power, the adjustment module 740 adjusts the current transmit power to the default preset transmit power, and uses the adjusted transmit power as a final transmit power.

It can be understood that, in this implementation manner, the change trend of the average value is determined according to two successive average values of the minimum values. In another implementation manner, multiple successive average values of the minimum values may be selected to determine the change trend of the average value, so as to more accurately determine the change trend of the average value and improve control accuracy of the power adjustment apparatus.

In the foregoing solution, a signal quality indicator is obtained according to a signal sent by a terminal device; minimum values of signal quality indicators are counted at intervals of a first preset time period, and at intervals of a second preset time period, an average value of the minimum values of the signal quality indicators within the second preset time period is calculated; and a transmit power is adjusted according to a change trend of the current average value of the minimum values of the signal quality indicators. In this way, a power adjustment apparatus can dynamically adjust a transmit power according to a signal quality indicator of a signal received by the terminal device, and even if a signal sent by the power adjustment apparatus is affected by ambient interference and signal strength attenuates due to blocking by an obstruction such as a wall, receiving performance of the terminal device can still be ensured, which can improve communication reliability.

Still referring to FIG. 7, in another implementation manner, when the signal quality indicator is a signal quality value, the adjustment module 620 is specifically configured to determine, according to the current average value, a preset range to which the average value belongs after the statistics collection module 730 obtains the average value of the minimum values, determine a change trend of the average value according to at least two successive average values, and adjust a transmit power according to the preset range to which the average value belongs and the change trend of the average value.

For example, when the signal quality indicator is a signal quality value, after receiving the average value of the minimum values sent by the statistics collection module 730, the adjustment module 740 determines, according to the current average value of the minimum values, the preset range to which the current average value belongs, determines the change trend of the average value of the minimum values according to at least two successive average values of the minimum values, and adjusts the transmit power according to the preset range to which the current average value of the minimum values belongs and the change trend of the average value of the minimum values. The preset range includes at least two subranges arranged in descending order, and each subrange corresponds to a transmit power. The change trend includes an upward trend, a steady trend, and a downward trend. It can be understood that, in this implementation manner, the at least two subranges are arranged according to a preset rule of descending order. In another implementation manner, the at least two subranges may be arranged according to another preset rule.

If in two successive average values of the minimum values, the second average value of the minimum values is greater than the first average value of the minimum values, the adjustment module 620 determines that the change trend of the average value of the minimum values is the upward trend.

If in two successive average values of the minimum values, the second average value of the minimum values is equal to the first average value of the minimum values, the adjustment module 620 determines that the change trend of the average value of the minimum values is the steady trend.

If in two successive average values of the minimum values, the second average value of the minimum values is less than the first average value of the minimum values, the adjustment module 620 determines that the change trend of the average value of the minimum values is the downward trend.

For example, a first subrange is [100, 70], and a transmit power corresponding to the first subrange is the default preset transmit power (for example, the default preset transmit power is 13 dBm); a second subrange is [69, 30], and a transmit power corresponding to the second subrange is 14 dBm; and a third subrange is less than 30, and a transmit power corresponding to the third subrange is 15 dBm.

If in two successive average values of the minimum values, the second average value of the minimum values belongs to the first subrange, whether the change trend of the average value of the minimum values is the upward trend or the steady trend or the downward trend, the adjustment module 740 does not adjust the transmit power, and maintains the transmit power 13 dBm.

If in two successive average values of the minimum values, the second average value of the minimum values belongs to the second subrange, if the change trend of the average value of the minimum values is the upward trend, the adjustment module 740 reduces the transmit power by 1 dBm based on 14 dBm; if the change trend of the current average value is the steady trend, the adjustment module 740 does not adjust the transmit power, and maintains the transmit power 14 dBm; if the change trend of the average value of the minimum values is the downward trend, the adjustment module 740 increases the transmit power by 1 dBm based on 14 dBm.

If in two successive average values of the minimum values, the second average value of the minimum values belongs to the third subrange, if the change trend of the average value of the minimum values is the upward trend, the adjustment module 740 reduces the transmit power by 2 dBm based on 15 dBm; if the change trend of the average value of the minimum values is the steady trend, the adjustment module 740 does not adjust the transmit power, and maintains the transmit power 15 dBm; if the change trend of the average value of the minimum values is the downward trend, the adjustment module 740 increases the transmit power by 2 dBm based on 15 dBm. It can be understood that, the transmit power that has been increased does not exceed a maximum value that is allowed for normal operation of the power adjustment apparatus.

In this implementation manner, if two successive average values of the minimum values belong to a same subrange, the adjustment module 740 increases or reduces, according to a change trend of the second average value of the minimum values, the transmit power based on a transmit power corresponding to the first average value of the minimum values. If two successive average values of the minimum values belong to different subranges, the adjustment module 740 increases or reduces, according to an range to which the second average value of the minimum values belongs and a change trend of the second average value, the transmit power based on a transmit power corresponding to the interval.

For example, if in two successive average values of the minimum values, the first average value of the minimum values and the second average value of the minimum values are both 100, the adjustment module 740 determines that a current average value is 100, that the current average value belongs to the first subrange, and that a change trend of the current average value is the steady trend. In this case, because the current average value belongs to the first subrange, a preset transmit power corresponding to the first subrange is 13 dBm, and the change trend of the average value of the minimum values is the steady trend, the adjustment module 740 does not adjust the transmit power, that is, maintains the default preset transmit power 13 dBm.

If in two successive average values of the minimum values, the first average value of the minimum values is 80, and the second average value of the minimum values is 70, the adjustment module 740 determines that a current average value is 70, that the average value of the minimum values belongs to the first subrange, and that a change trend of the average value is the downward trend. In this case, because the current average value belongs to the first subrange, a preset transmit power corresponding to the first subrange is 13 dBm, and the change trend of the average value of the minimum values is the downward trend, the adjustment module 740 does not adjust the transmit power, that is, maintains the default preset transmit power 13 dBm.

If in two successive average values of the minimum values, the first average value of the minimum values is 80, and the second average value of the minimum values is 85, the adjustment module 740 determines that the second average value 85 of the minimum value is a current average value, that the second average value of the minimum values belongs to the first subrange, and that a change trend of the second average value is the upward trend. In this case, because the current average value belongs to the first subrange, a preset transmit power corresponding to the first subrange is 13 dBm, and the change trend of the average value of the minimum values is the downward trend, the adjustment module 740 does not adjust the transmit power, that is, maintains the default preset transmit power 13 dBm.

If in two successive average values of the minimum values, the first average value of the minimum values is 70, and the second average value of the minimum values is 65, the adjustment module 740 determines that a current average value is 65, that the current average value belongs to the second subrange, and that a change trend of the current average value is the downward trend. In this case, because the first average value of the minimum values belongs to the first subrange, the current average value belongs to the second subrange, a preset transmit power corresponding to the second subrange is 14 dBm, and the change trend of the average value of the minimum values is the downward trend, the adjustment module 620 increases the transmit power by 1 dBm based on 14 dBm, and uses 15 dBm as a final transmit power.

If in two successive average values of the minimum values, the first average value of the minimum values is 50, and the second average value of the minimum values is 65, the adjustment module 740 determines that a current average value is 65, that the current average value belongs to the second subrange, and that a change trend of the current average value is the upward trend. In this case, because the first average value of the minimum values and the current average value both belong to the second subrange, a preset transmit power corresponding to the second subrange is 14 dBm, and the change trend of the average value of the minimum values is the upward trend, the adjustment module 740 reduces the transmit power by 1 dBm based on 14 dBm, and uses 13 dBm as a final transmit power.

If in two successive average values of the minimum values, the first average value of the minimum values is 65, and the second average value of the minimum values is 65, the adjustment module 740 determines that a current average value is 65, that the current average value belongs to the second subrange, and that a change trend of the current average value is the steady trend. In this case, because the first average value of the minimum values and the current average value both belong to the second subrange, the change trend of the average value of the minimum values is the steady trend, and the transmit power 14 dBm corresponding to the first average value 65 of the minimum value is a current transmit power, the adjustment module 740 does not adjust the transmit power, and uses the current transmit power 14 dBm as a final transmit power.

If in two successive average values of the minimum values, the first average value of the minimum values is 65, and the second average value of the minimum values is 45, the adjustment module 740 determines that a current average value is 45, that the current average value belongs to the second subrange, and that a change trend of the current average value is the downward trend. In this case, because the first average value of the minimum values and the current average value both belong to the second subrange, the change trend of the average value of the minimum values is the downward trend, and the transmit power 14 dBm corresponding to the first average value 65 of the minimum value is a current transmit power, the adjustment module 740 increases the transmit power by 1 dBm based on 14 dBm, and uses 15 dBm as a final transmit power.

If in two successive average values of the minimum values, the first average value of the minimum values is 45, and the second average value of the minimum values is 40, the adjustment module 740 determines that a current average value is 40, that the average value of the minimum values belongs to the second subrange, and that a change trend of the average value is the downward trend. In this case, the first average value of the minimum values and the current average value both belong to the second subrange, and the change trend of the average value of the minimum values is the downward trend. Besides, because the power adjustment apparatus adjusts a final transmit power corresponding to the average value 65 of the minimum value to 15 dBm in a previous power adjustment process, in a current power adjustment process, the transmit power 15 dBm corresponding to the first average value 65 of the minimum value is a current transmit power. Therefore, the adjustment module 740 increases the transmit power by 1 dBm based on 15 dBm, and uses 16 dBm as a final transmit power.

The rest can be deduced by analogy, and details are not described herein.

It can be understood that, in this implementation manner, the change trend of the average value is determined according to two successive average values of the minimum values. In another implementation manner, multiple successive average values of the minimum values may be selected to determine the change trend of the average value, so as to more accurately determine the change trend of the average value, adjust the transmit power according to the change trend of the average value, and improve control accuracy of the power adjustment apparatus. A value by which the transmit power is increased or reduced may be set according to an actual situation.

In the foregoing solution, a signal quality indicator is obtained according to a signal sent by a terminal device; minimum values of signal quality indicators are counted at intervals of a first preset time period, and at intervals of a second preset time period, an average value of the minimum values of the signal quality indicators within the second preset time period is calculated; and a transmit power is adjusted according to a preset range to which the average value belongs and a change trend of the current average value. In this way, a power adjustment apparatus can dynamically adjust a transmit power according to a signal quality indicator of a signal received by the terminal device, which improves sensitivity and accuracy of power adjustment, and even if a signal sent by the power adjustment apparatus is affected by ambient interference and signal strength attenuates due to blocking by an obstruction such as a wall, receiving performance of the receiving device can still be ensured, which can improve communication reliability.

Figure 8:
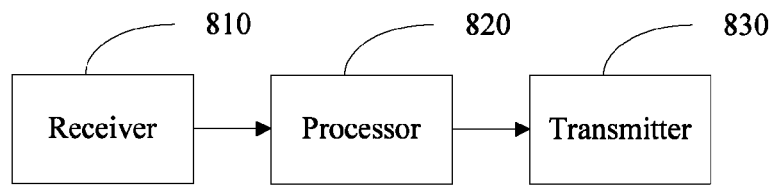
FIG. 8 is a schematic structural diagram of still another implementation manner of a power adjustment apparatus according to this application.

Referring to FIG. 8, FIG. 8 is a schematic structural diagram of still another implementation manner of a power adjustment apparatus according to this application. The power adjustment apparatus may be a gateway or a router. The power adjustment apparatus in this implementation manner includes: a receiver 810, a processor 820, and a transmitter 830, where the receiver 810 is connected to the processor 820, and the transmitter 830 is connected to the processor 820.

The receiver 810 is configured to receive a signal sent by a terminal device. The receiver 810 sends the received signal to the processor 820.

The processor 820 is configured to obtain a signal quality indicator according to the signal received by the receiver 810, and adjust a transmit power according to the signal quality indicator, where the signal quality indicator is used to identify signal quality of a signal sent by the power adjustment apparatus and received by the terminal. The processor 820 sends a value of the adjusted transmit power to the transmitter 830.

The transmitter 830 is configured to send a signal according to the transmit power adjusted by the processor 820.

In the foregoing solution, a signal quality indicator is obtained according to a signal sent by a terminal device, and a transmit power is adjusted according to the signal quality indicator. In this way, a power adjustment apparatus can dynamically adjust a transmit power according to a signal quality indicator of a signal received by the terminal device, and even if a signal sent by the power adjustment apparatus is affected by ambient interference and signal strength attenuates due to blocking by an obstruction such as a wall, receiving performance of the receiving device can still be ensured, which can improve communication reliability.

Figure 9:
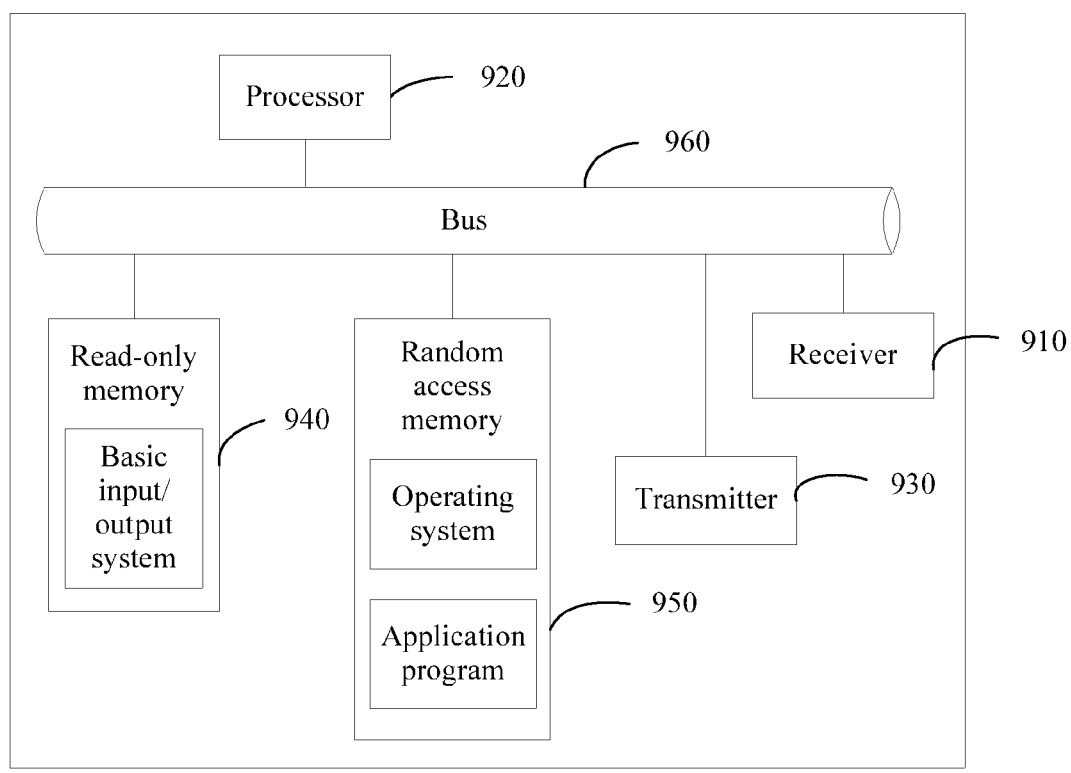
FIG. 9 is a schematic structural diagram of yet another implementation manner of a power adjustment apparatus according to this application.

Referring to FIG. 9, FIG. 9 is a schematic structural diagram of yet another implementation manner of a power adjustment apparatus according to this application. The power adjustment apparatus may be a gateway or a router. The power adjustment apparatus in this implementation manner includes: a receiver 910, a processor 920, a transmitter 930, a read-only memory 940, a random access memory 950, and a bus 960.

The receiver 910 is configured to receive a signal.

The processor 920 controls an operation of the power adjustment apparatus. The processor 920 may be referred to as a central processing unit (CPU). The processor 920 may be an integrated circuit chip, and has a signal processing capability. The processor 920 may be a general purpose processor, a digital signal processor (DSP), an application-specific integrated circuit (ASIC), a field-programmable gate array (FPGA) or another programmable logic device, a discrete-gate or transistor logic device, or a discrete hardware component. The general purpose processor may be a microprocessor, or the processor may be any conventional processor or the like.

The transmitter 930 is configured to send a signal.

A memory may include the read-only memory 940 and the random access memory 950, and provides an instruction and data for the processor 920. A part of the memory may further include a non-volatile random-access memory (NVRAM).

Components of the power adjustment apparatus are coupled together by using the bus 960. In addition to a data bus, the bus 960 may further include a power bus, a control bus, a status signal bus, and the like. However, for clarity of description, various types of buses are marked as the bus 960 in the figure.

The memory stores the following elements: an executable module or a data structure, or a subset thereof, or an extended set thereof: an operation instruction, including various operation instructions, used to implement various operations; and an operating system, including various system programs, used to implement various basic services and process hardware-based tasks.

In this embodiment of the present disclosure, the processor 920 executes the following operations by invoking an operation instruction stored in the memory (the operation instruction may be stored in the operating system).

The receiver 910 receives a signal sent by a terminal device, and the receiver 910 sends the received signal to the processor 920.

The processor 920 obtains a signal quality indicator according to the signal received by the receiver 910, and adjust a transmit power according to the signal quality indicator, where the signal quality indicator is used to identify signal quality of a signal sent by the power adjustment apparatus and received by the terminal. The processor 920 sends a value of the adjusted transmit power to the transmitter 930.

The transmitter 930 sends a signal according to the transmit power adjusted by the processor 920.

Specifically, the signal quality indicator is a signal quality value or a noise quality value, where the signal quality value is used to identify quality of the signal sent by the power adjustment apparatus and received by the terminal device, and the noise quality value is used to identify noise of the signal received by the terminal device.

Optionally, the processor 920 determines a minimum values of signal quality indicators at intervals of a first preset time period, calculates an average value of the minimum values at intervals of a second preset time period, and adjusts the transmit power according to the average value of the minimum values after obtaining the average value of the minimum values.

Specifically, the processor 920 determines, according to the current average value, a preset range to which the average value belongs after obtaining the average value of the minimum values, and adjusts the transmit power according to the preset range to which the average value belongs, where the preset range includes at least two intervals arranged according to a preset rule, and each preset range corresponds to a transmit power.

Specifically, when the signal quality indicator is a signal quality value, the processor 920 determines a change trend of the average value according to at least two successive average values after obtaining the average value of the minimum values, and adjusts the transmit power according to the change trend of the average value.

Specifically, when the signal quality indicator is a signal quality value, the processor 920 determines, according to the current average value, a preset range to which the average value belongs after obtaining the average value of the minimum values, determines a change trend of the average value according to at least two successive average values, and adjusts the transmit power according to the preset range to which the average value belongs and the change trend of the average value, to ensure receiving performance of the terminal device.

In the foregoing solution, a signal quality indicator is obtained according to a signal sent by a terminal device, and a transmit power is adjusted according to the signal quality indicator. In this way, a power adjustment apparatus can dynamically adjust a transmit power according to a signal quality indicator of a signal received by the terminal device, and even if a signal sent by the power adjustment apparatus is affected by ambient interference and signal strength attenuates due to blocking by an obstruction such as a wall, receiving performance of the terminal device can still be ensured, which can improve communication reliability.

Besides, minimum values of signal quality indicators are counted at intervals of a first preset time period, and at intervals of a second preset time period, an average value of the minimum values of the signal quality indicators within the second preset time period is calculated; and the transmit power is adjusted according to a preset range to which the average value belongs, or the transmit power is adjusted according to a change trend of the average value, or the transmit power is adjusted according to a preset range to which the average value belongs and a change trend of the average value. In this way, an access point can dynamically adjust a transmit power according to a signal quality indicator of a signal received by the terminal device, which improves sensitivity and accuracy of power adjustment and further improves communication reliability.

It can be understood that, in the implementation manner disclosed in this application, a preset range to which an average value of a minimum value of a signal quality value belongs and a transmit power corresponding to each preset range may be set according to an actual requirement.

It can be understood that, in the implementation manner disclosed in this application, a signal quality indicator is a signal quality value or a noise quality value; when the signal quality indicator is a noise quality value, because the noise quality value is random, a change trend of the noise quality value is unpredictable, and in this case, a transmit power cannot be adjusted according to a change trend of an average value of a minimum values of the signal quality indicators. In another implementation manner, the signal quality indicator may be another parameter. For a specific power adjustment manner, refer to the foregoing implementation manner according to an actual situation. When the signal quality indicator is a random parameter whose change trend is unpredictable, refer to the implementation manner of the noise quality value; when a change trend of the signal quality indicator is predictable, refer to the implementation manner of the signal quality value.

In the several implementation manners provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially may be implemented in the form of a software product. The software product is stored in a storage medium and includes several instructions for instructing a computer device (which may be a personal computer, a server, or a network device) or a processor to perform all or a part of the steps of the methods described in the implementation manners of this application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A power adjustment apparatus comprising:
a memory comprising instructions;
a receiver coupled to a processor and configured to receive a signal from a terminal device;
the processor coupled to the receiver and configured to:
obtain a signal quality indicator according to the signal; and
adjust a transmit power to an adjusted transmit power according to the signal quality indicator; and
a transmitter coupled to the processor and configured to transmit a second signal according to the adjusted transmit power, wherein the processor is further configured to:
collect statistics on minimum values of signal quality indicators at intervals of a first preset time period;
calculate an average value on the minimum values of signal quality indicators at intervals of a second preset time period; and
adjust the transmit power according to the average value.

2. The power adjustment apparatus of claim 1, wherein the signal quality indicator is a signal quality value or a noise quality value, and wherein the signal quality value identifies a quality of the signal sent by the power adjustment apparatus and received by the terminal device, and wherein the noise quality value identifies a noise of the signal received by the terminal device.

3. The power adjustment apparatus of claim 1, wherein the instructions further cause the processor to be configured to:
determine, according to the average value, a preset range to which the average value belongs, wherein the preset range comprises subranges arranged according to a preset rule and corresponding to transmit powers; and
further adjust the transmit power according to the preset range.

4. The power adjustment apparatus of claim 1, wherein the signal quality indicator is a signal quality value, and wherein the instructions further cause the processor to be configured to:
determine a change trend of the average value according to successive average values; and
further adjust the transmit power according to the change trend of the average value.

5. The power adjustment apparatus of claim 1, wherein the signal quality indicator is a signal quality value, and wherein the instructions further cause the processor to be configured to:
determine, according to the average value, a preset range to which the average value belongs;
determine a change trend of the average value according to successive average values; and
further adjust the transmit power according to the preset range and the change trend.

6. The power adjustment apparatus of claim 1, wherein the instructions further cause the processor to be configured to use the signal quality indicator to identify a signal quality of the signal received at the terminal device.

7. A power adjustment method comprising:
receiving a signal from a terminal device;
obtaining a signal quality indicator according to the signal;
adjusting a transmit power to an adjusted transmit power according to the signal quality indicator;
transmitting a second signal according to the adjusted transmit power;

determining minimum values of signal quality indicators at intervals of a first preset time period;

calculating an average value of the minimum values of signal quality indicators at intervals of a second preset time period; and further adjusting the transmit power according to the average value.

8. The power adjustment method of claim 7, wherein the signal quality indicator is a signal quality value or a noise quality value, and wherein the signal quality value identifies a quality of the signal sent by the power adjustment apparatus and received by the terminal device, and wherein the noise quality value identifies a noise of the signal received by the terminal device.

9. The power adjustment method of claim 7, wherein adjusting the transmit power according to the signal quality indicator further comprises:

determining, according to the average value, a preset range to which the average value belongs, wherein the preset range comprises subranges arranged according to a preset rule and corresponding to transmit powers; and further adjusting the transmit power according to the preset range.

10. The power adjustment method of claim 7, wherein the signal quality indicator is a signal quality value, and wherein adjusting the transmit power according to the signal quality indicator further comprises:

determining a change trend of the average value according to successive average values; and further adjusting the transmit power according to the change trend of the average value.

11. The power adjustment method of claim 7, wherein the signal quality indicator is a signal quality value, and wherein adjusting the transmit power according to the signal quality indicator further comprises:

determining, according to the average value, a preset range to which the average value belongs;

determining a change trend of the average value according to successive average values; and further adjusting the transmit power according to the preset range and the change trend.

12. The power adjustment method of claim 7, further comprising using the signal quality indicator to identify a signal quality of the signal received at the terminal device.

* * * * *